US012157308B2

(12) United States Patent
Tanaka et al.

(10) Patent No.: US 12,157,308 B2
(45) Date of Patent: Dec. 3, 2024

(54) LIQUID DISCHARGING APPARATUS

(71) Applicant: BROTHER KOGYO KABUSHIKI KAISHA, Nagoya (JP)

(72) Inventors: Nobumasa Tanaka, Nagoya (JP); Ryuji Horata, Gamagori (JP); Takafumi Nakase, Nagoya (JP); Masayoshi Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/931,617

(22) Filed: Sep. 13, 2022

(65) Prior Publication Data

US 2023/0087301 A1 Mar. 23, 2023

(30) Foreign Application Priority Data

Sep. 17, 2021 (JP) ................................ 2021-152440

(51) Int. Cl.
*B41J 2/045* (2006.01)
*B41J 2/135* (2006.01)

(52) U.S. Cl.
CPC ........... *B41J 2/04541* (2013.01); *B41J 2/135* (2013.01)

(58) Field of Classification Search
CPC .... B41J 2/04541; B41J 2/135; B41J 2/04557; B41J 2/04586; B41J 2/04548
See application file for complete search history.

(56) References Cited

U.S. PATENT DOCUMENTS 9,636,908 B2 * 5/2017 Yamashita ........... B41J 2/14233
2012/0327150 A1 * 12/2012 Takagi ................. B41J 2/04548 347/11

FOREIGN PATENT DOCUMENTS

JP 2007-136858 A 6/2007
JP 2012-210768 A 11/2012

* cited by examiner

*Primary Examiner* — Thinh H Nguyen
(74) *Attorney, Agent, or Firm* — Scully, Scott, Murphy & Presser, P.C.

(57) ABSTRACT

There is provided a liquid discharging apparatus including: a liquid discharging head; an electrode; a voltage supplier configured to generate an electric potential difference between the liquid discharging head and the electrode; a first output part; and a voltage comparer connected to the voltage supplier. The voltage comparer includes a comparing signal output part configured to output a comparing signal. The voltage supplier is configured to: execute boosting to increase the magnitude of the voltage to be outputted from the voltage supplier in a case that the comparing signal indicates that a magnitude of the voltage outputted from the voltage supplier is not more than a magnitude of a predetermined voltage; and stop the boosting in a case that the comparing signal indicates that the magnitude of the voltage outputted from the voltage supplier is larger than the magnitude of the predetermined voltage.

13 Claims, 19 Drawing Sheets

| | | TEMPERATURE X | | |
|---|---|---|---|---|
| | | X < X1 | X1 ≤ X < X2 | X ≥ X2 |
| HUMIDITY Y | Y < Y1 | R11 | R12 | R13 |
| | Y1 ≤ Y < Y2 | R21 | R22 | R23 |
| | Y ≥ Y2 | R31 | R32 | R33 |

LIQUID DISCHARGING APPARATUS

REFERENCE TO RELATED APPLICATIONS

This application claims priority from Japanese Patent Application No. 2021-152440 filed on Sep. 17, 2021. The entire content of the priority application is incorporated herein by reference.

BACKGROUND ART

An ink-jet printer, which performs the recording by discharging an ink from nozzles, is known as an example of the liquid discharging apparatus for discharging a liquid from nozzles. In a certain ink-jet printer, a capping member for covering the nozzles has an inspection area in which an electrode member is included. Then, the voltage is applied to a cavity plate for constructing a printing head by means of a boosting circuit, and thus the electric potential difference is generated between the printing head and the inspection area. On the basis of the voltage change in the inspection area provided when the printing head is allowed to perform the operation for discharging the ink toward the inspection area from the nozzles in this state, it is inspected whether or not the ink is discharged normally from the nozzles.

DESCRIPTION

In this context, in the case of Japanese Patent Application Laid-open No. 2007-136858, when it is inspected whether or not the ink is normally discharged from the nozzles as described above, if the electric potential difference, which is generated between the printing head and the inspection area, fluctuates, then the change amount of the voltage of the inspection area, which is provided when the ink is discharged from the nozzles, fluctuates. Therefore, in the case of Japanese Patent Application Laid-open No. 2007-136858, it is preferable to stabilize the voltage applied to the cavity plate in order to obtain a correct inspection result.

An object of the present disclosure is to provide a liquid discharging apparatus which makes it possible to more accurately determine whether or not the liquid is normally discharged from the nozzles by stabilizing the electric potential difference between a liquid discharging head and an electrode to which the liquid is discharged in order to perform the inspection for the discharging of the liquid from the nozzles.

A liquid discharging apparatus including:

a liquid discharging head having a nozzle configured to discharge a liquid;

an electrode arranged so that the electrode is capable of being opposed to the nozzle;

a voltage supplier configured to generate an electric potential difference between the liquid discharging head and the electrode by applying a voltage to the liquid discharging head or the electrode;

a first output part electrically connected to the liquid discharging head or the electrode, the first output part being configured to output a voltage corresponding to an electric change, of the liquid discharging head or the electrode electrically connected to the first output part, caused in a case that the liquid discharging head performs an inspection driving for discharging the liquid from the nozzle toward the electrode while the liquid discharging head and the electrode are opposed to one another; and a voltage comparer electrically connected to the voltage supplier.

The voltage comparer includes a comparing signal output part configured to output a comparing signal indicating whether or not a magnitude of the voltage outputted from the voltage supplier is larger than a magnitude of a predetermined voltage.

The voltage supplier is configured to:

execute boosting to increase the magnitude of the voltage to be outputted from the voltage supplier in a case that the comparing signal indicates that the magnitude of the voltage outputted from the voltage supplier is not more than the magnitude of the predetermined voltage; and stop the boosting in a case that the comparing signal indicates that the magnitude of the voltage outputted from the voltage supplier is larger than the magnitude of the predetermined voltage.

According to the present disclosure, it is possible to stabilize the magnitude of the voltage outputted from the voltage supplier, and it is possible to accurately determine whether or not the liquid is normally discharged from the nozzles.

Figure 5A:
Figure 5B:
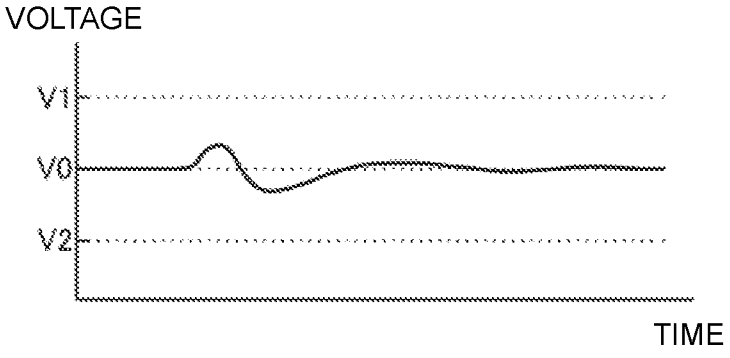
Figure 5C:
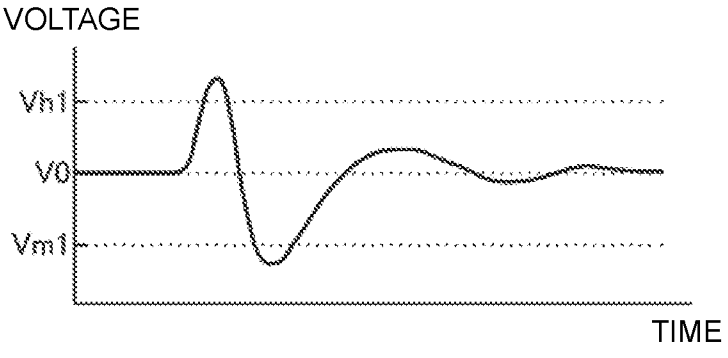

FIG. 5A is a drawing illustrative of a signal sent from a high pass filter to a discharging detection output part and a signal outputted from the discharging detection output part when no ink is discharged from nozzle in the inspection driving. FIG. 5B is a drawing illustrative of a signal sent from the high pass filter to the discharging detection output part when the ink is discharged from the nozzle in the inspection driving. FIG. 5C is a drawing illustrative of a signal outputted from the discharging detection output part when the ink is discharged from the nozzle in the inspection driving.

Figure 6:
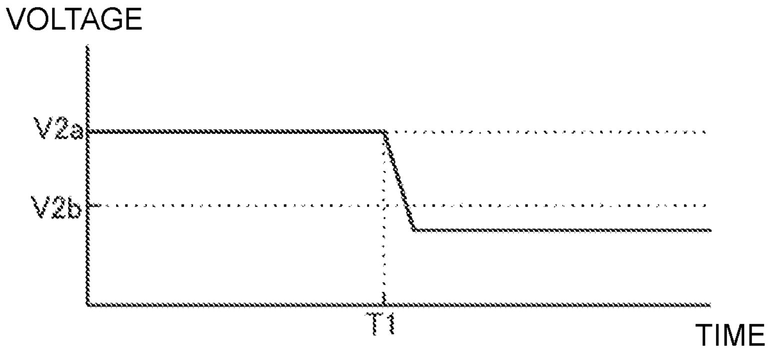

FIG. 6 is a drawing illustrative of a signal outputted from a first short circuit output part.

Figure 7A:
Figure 7B:
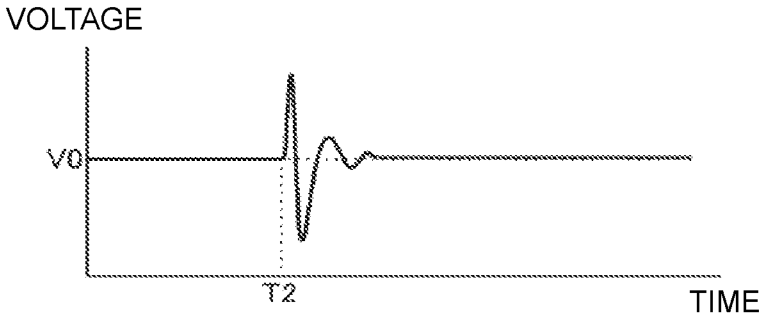
Figure 7C:
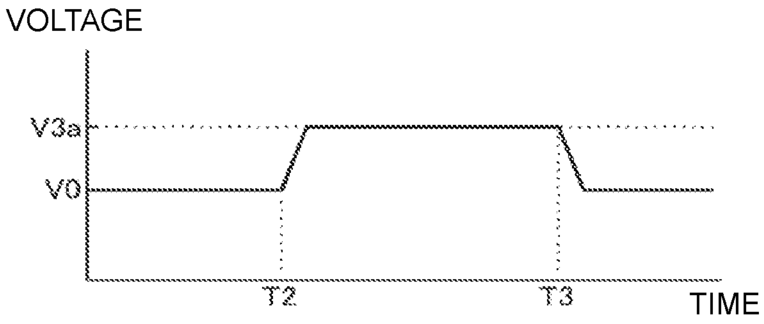

FIG. 7A is a drawing illustrative of a signal received by a latch circuit when no temporary short circuit is formed. FIG. 7B is a drawing illustrative of a signal received by the latch circuit when the temporary short circuit is formed. FIG. 7C is a drawing illustrative of a signal outputted from the latch circuit (second short circuit output part).

Figure 8A:
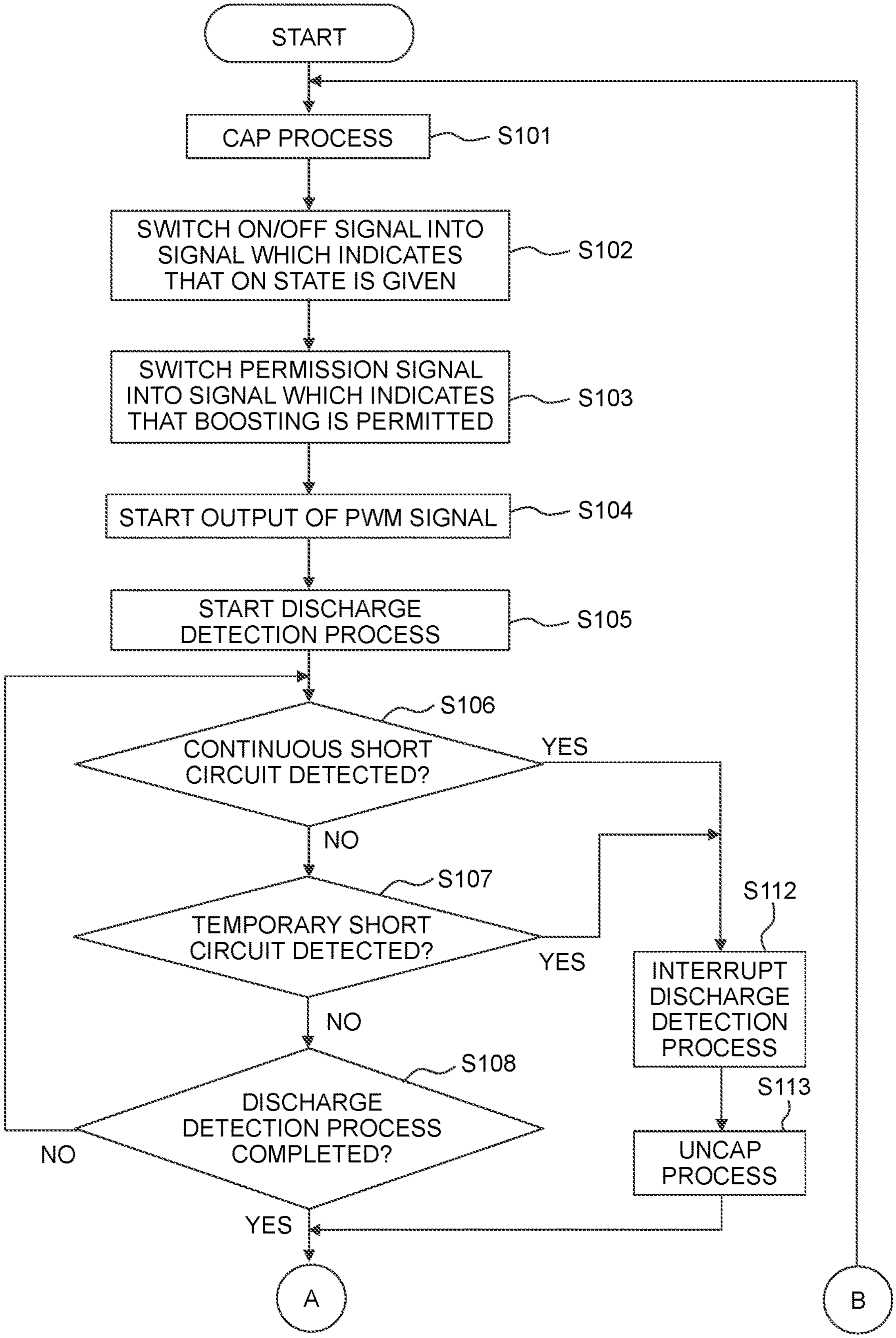
Figure 8B:
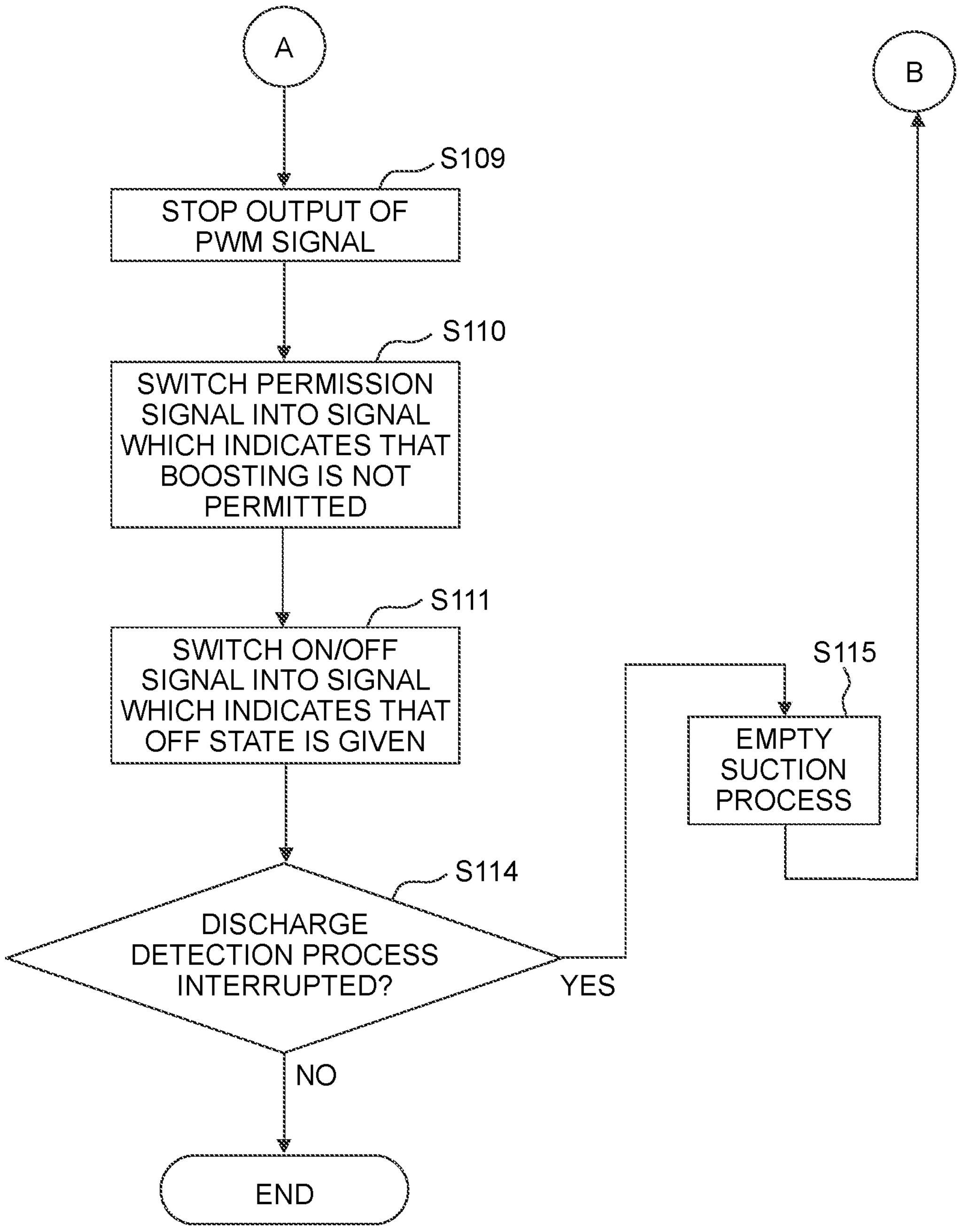

FIG. 8A and FIG. 8B are flow charts illustrative of a flow of a process when an inspection instruction signal is received.

Figure 9:
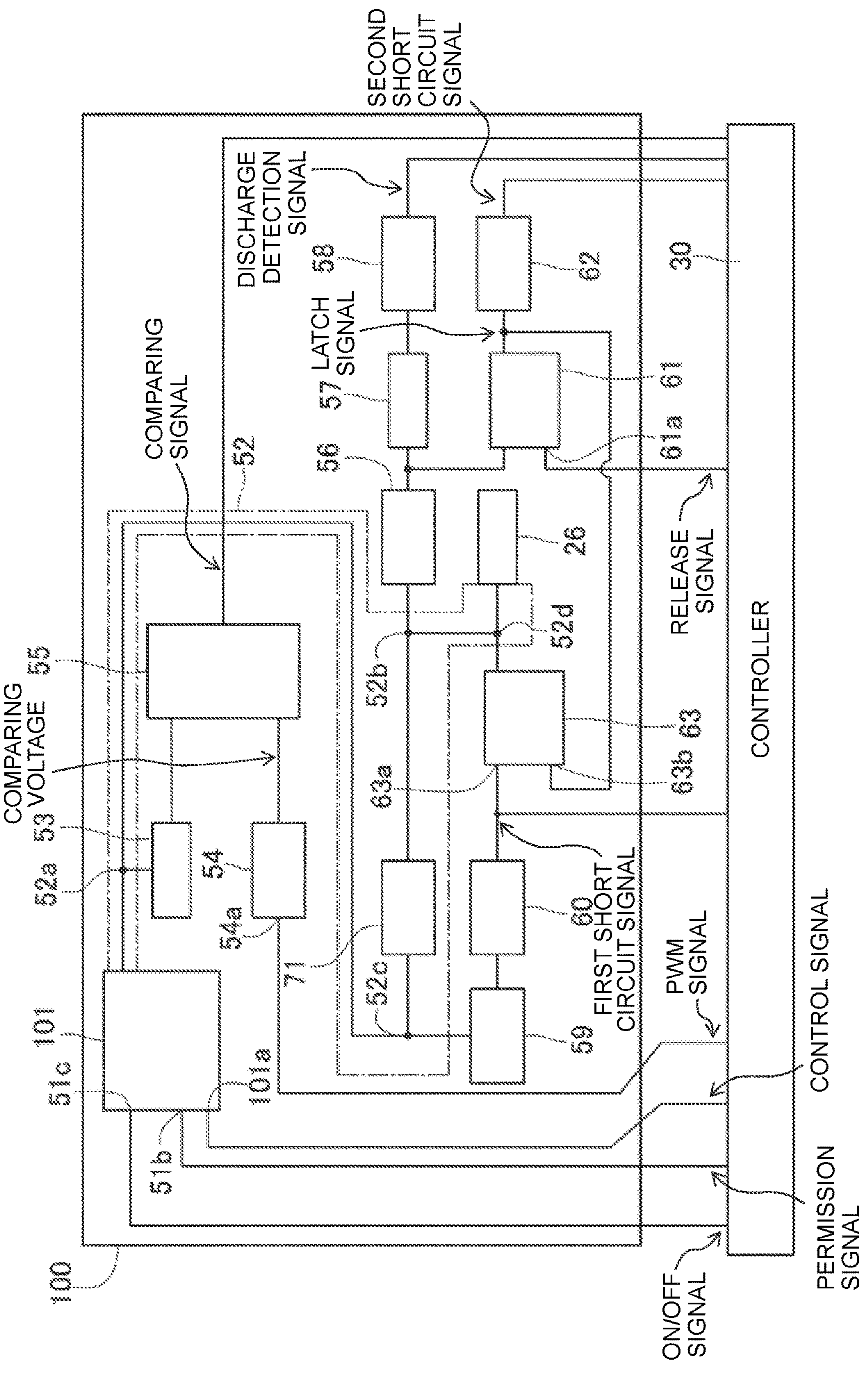

FIG. 9 is a block diagram illustrative of configuration of an inspection circuit.

Figure 10:
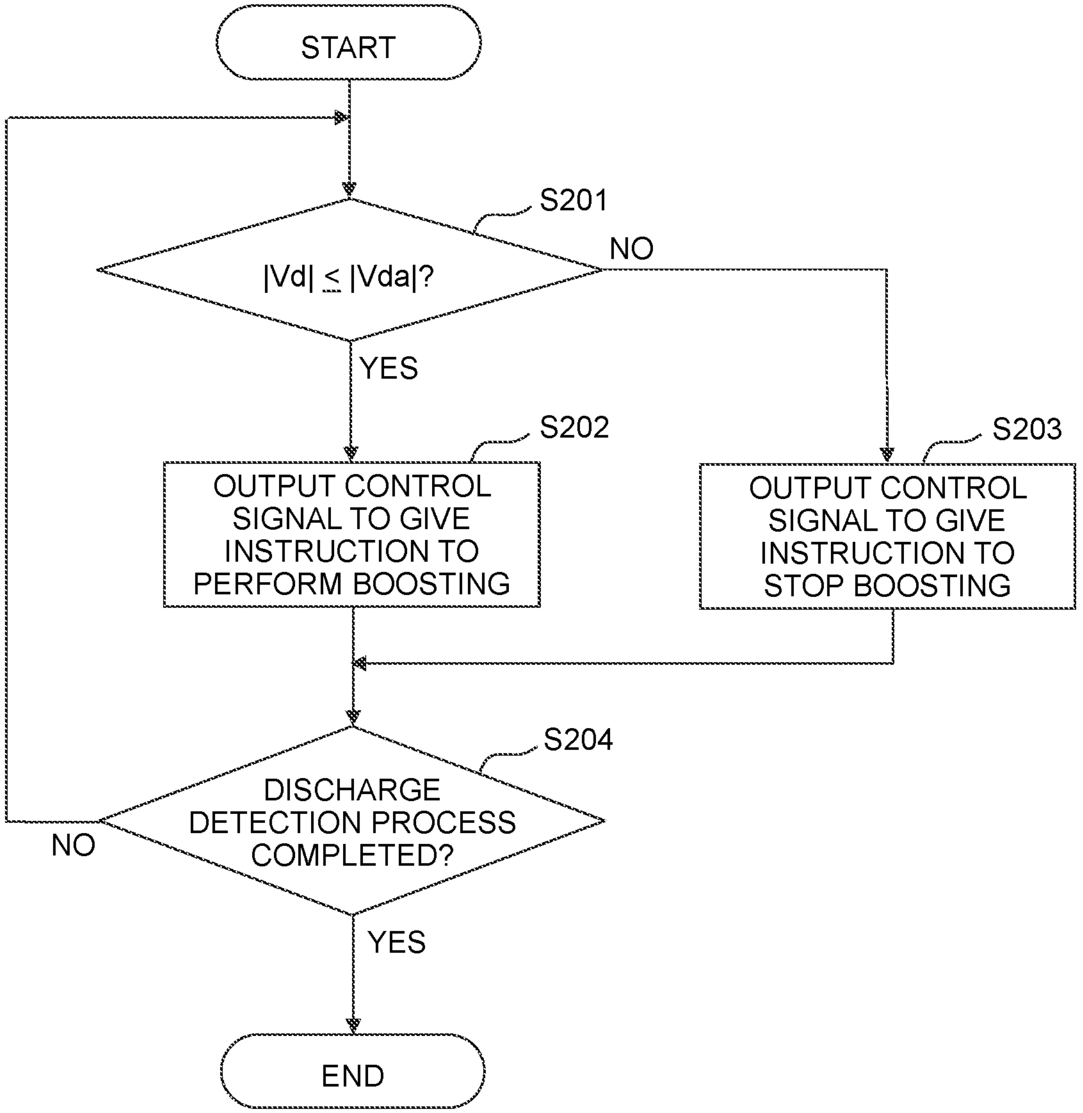

FIG. 10 is a flow chart illustrative of a flow of a process to output a control signal.

Figure 11:
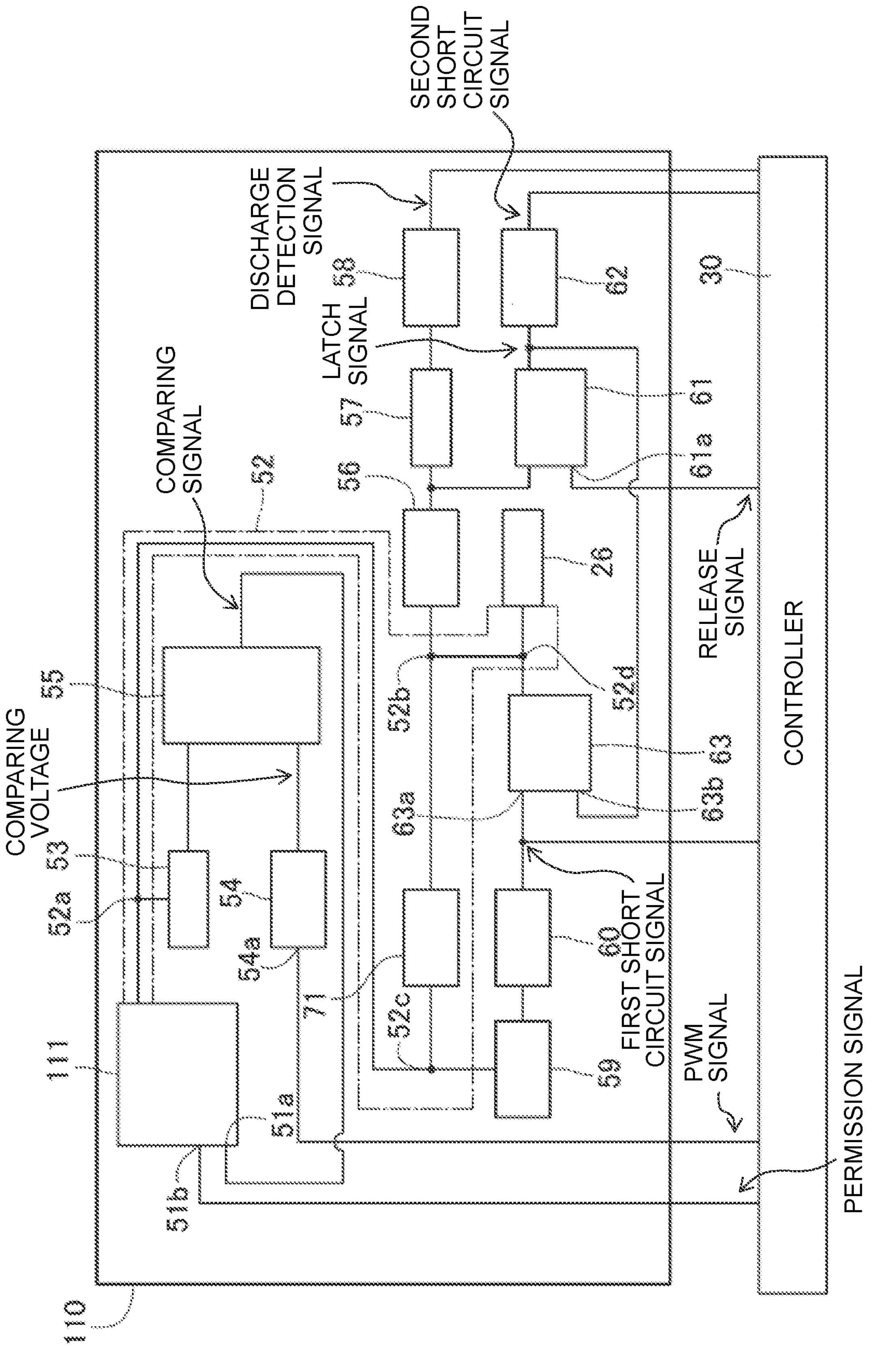

FIG. 11 is a drawing illustrative of an example in which the inspection circuit is provided with no ON/OFF signal receiving part.

Figure 12A:
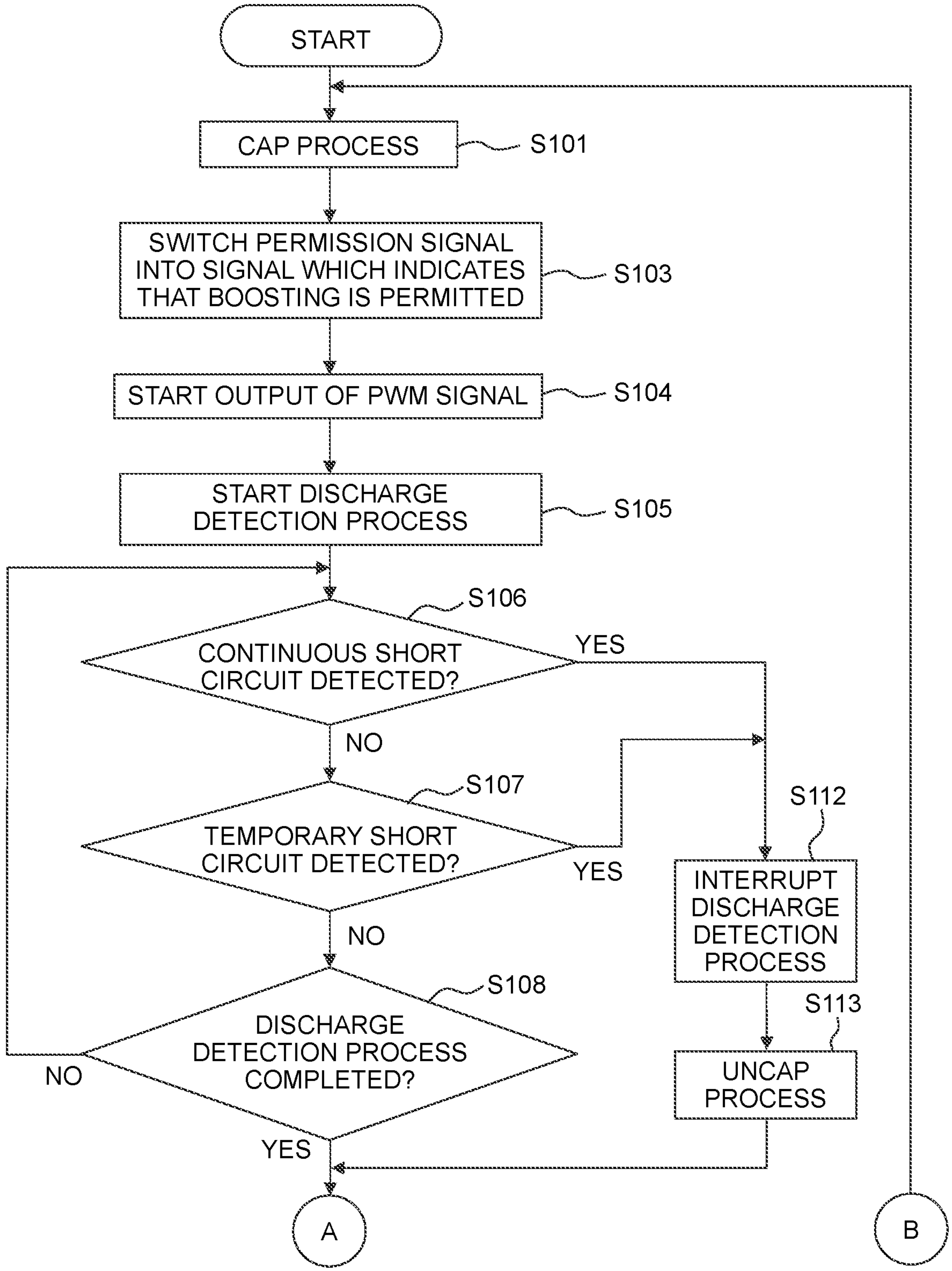
Figure 12B:
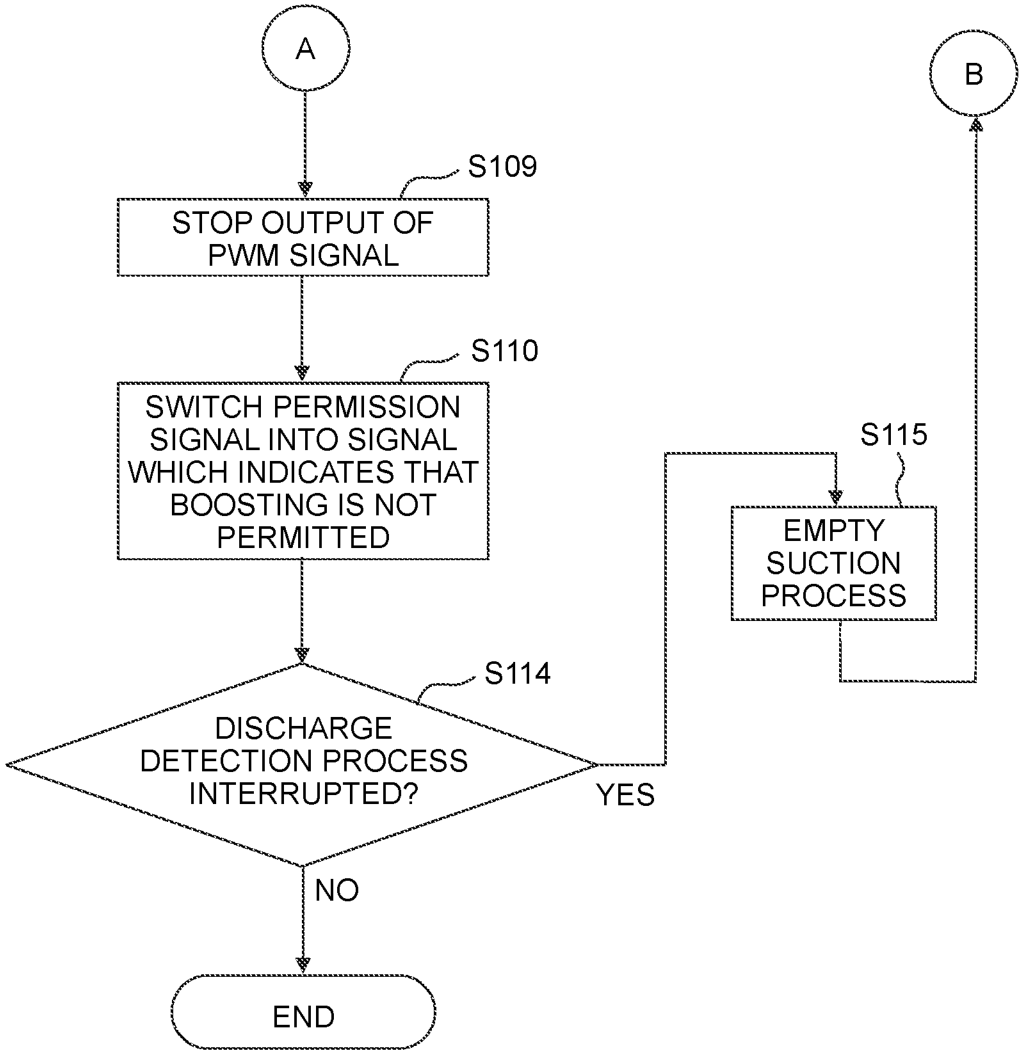

FIG. 12A and FIG. 12B are flow charts illustrative of a flow of a process when the inspection instruction signal is received in the example depicted in FIG. 11.

Figure 13:
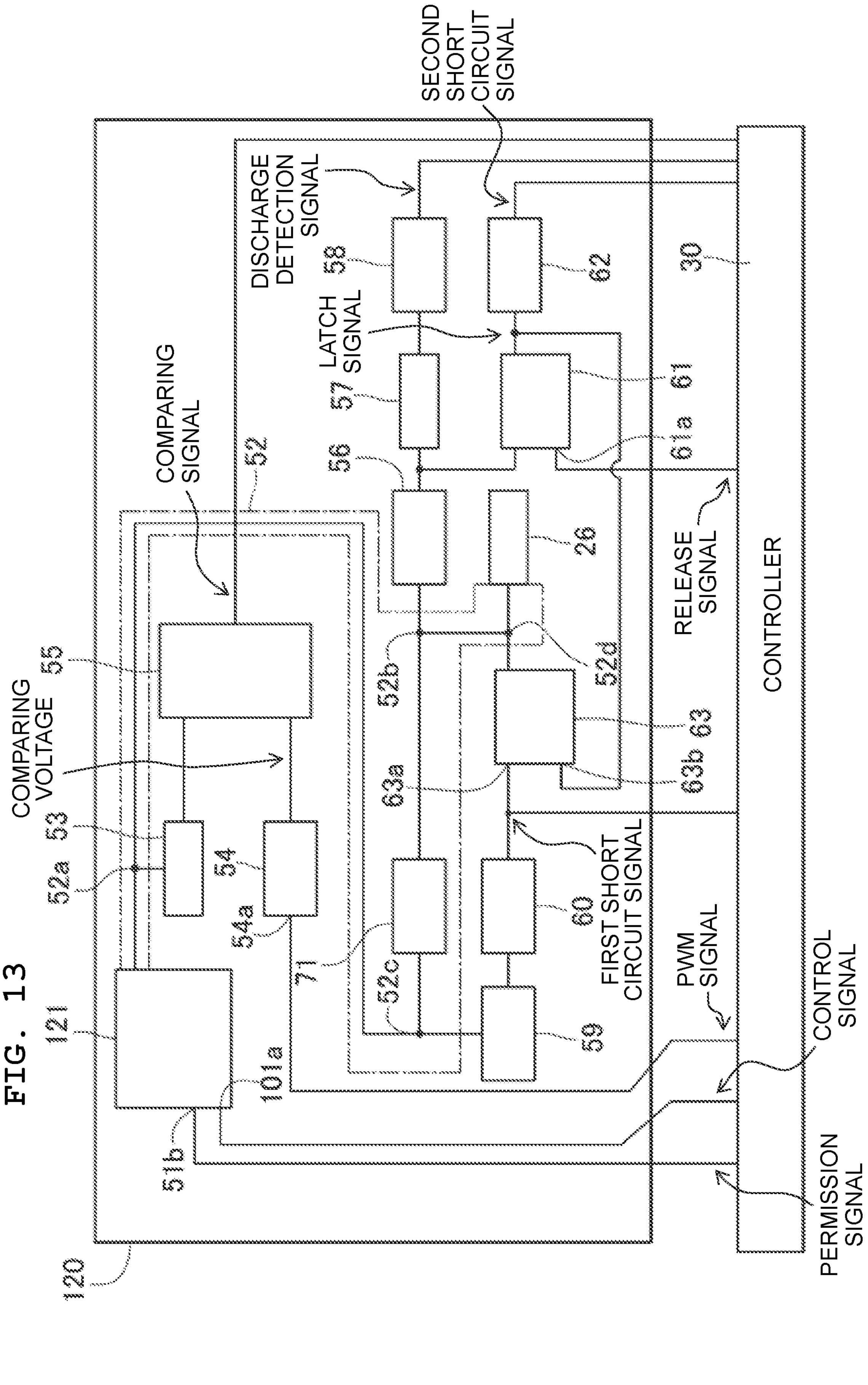

FIG. 13 is a drawing illustrative of an example in which the inspection circuit is provided with no ON/OFF signal receiving part.

Figure 14A:
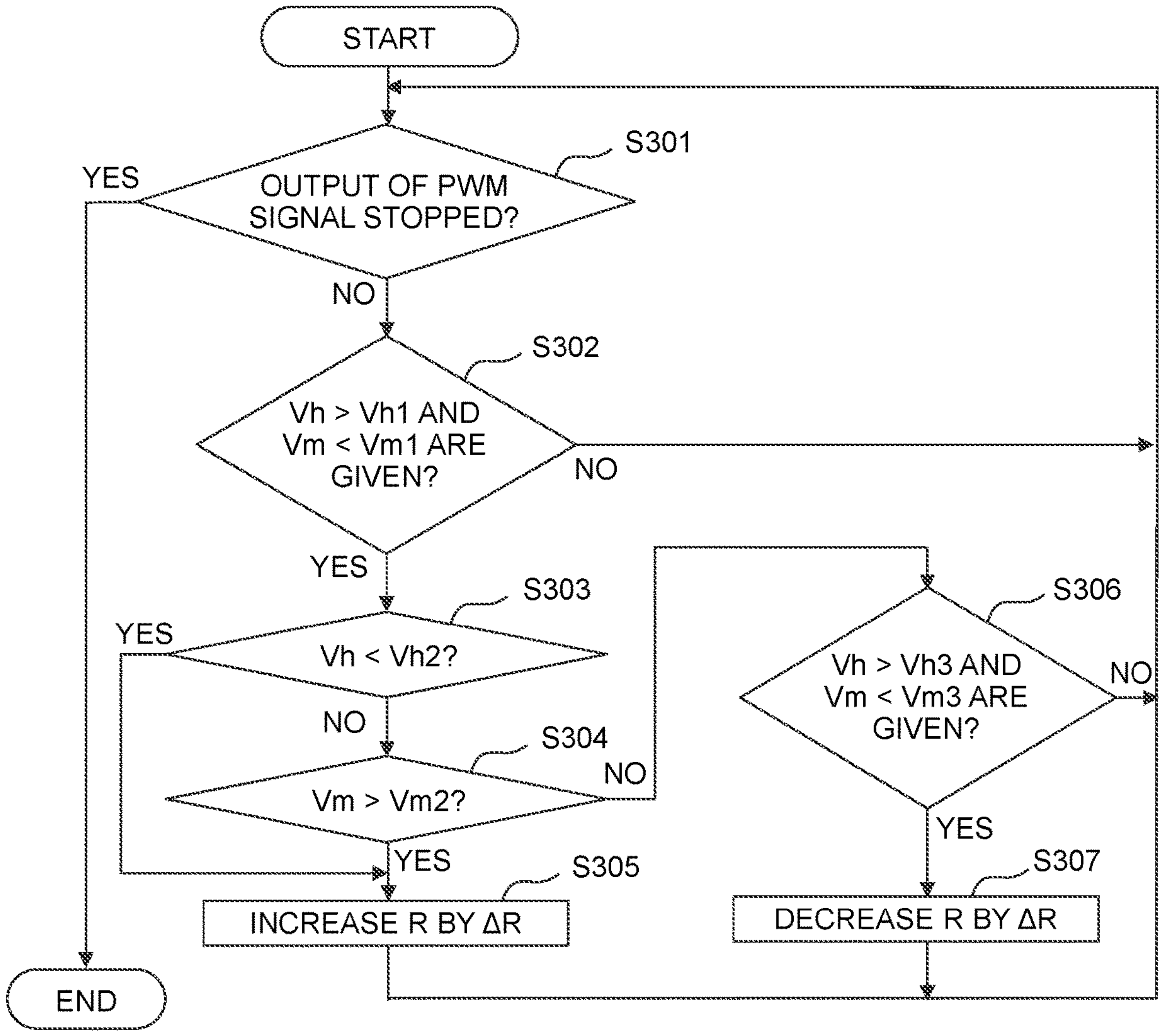
Figure 14B:
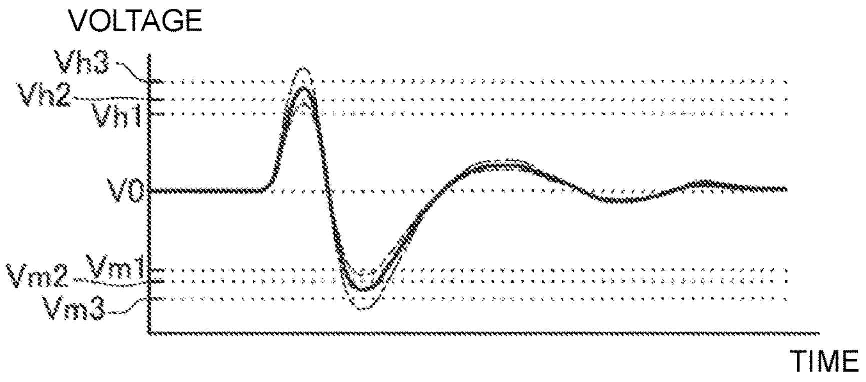

FIG. 14A is a flow chart illustrative of a flow of a process to change the rate R (ratio R) of the PWM signal on the basis of the discharging detection signal outputted from the discharging detection output part. FIG. 14B is a drawing illustrative of a case in which the magnitude of the voltage of the discharging detection signal outputted from the discharging detection output part is excessively small and a case in which the magnitude of the voltage of the discharging detection signal outputted from the discharging detection output part is excessively large.

Figure 15A:
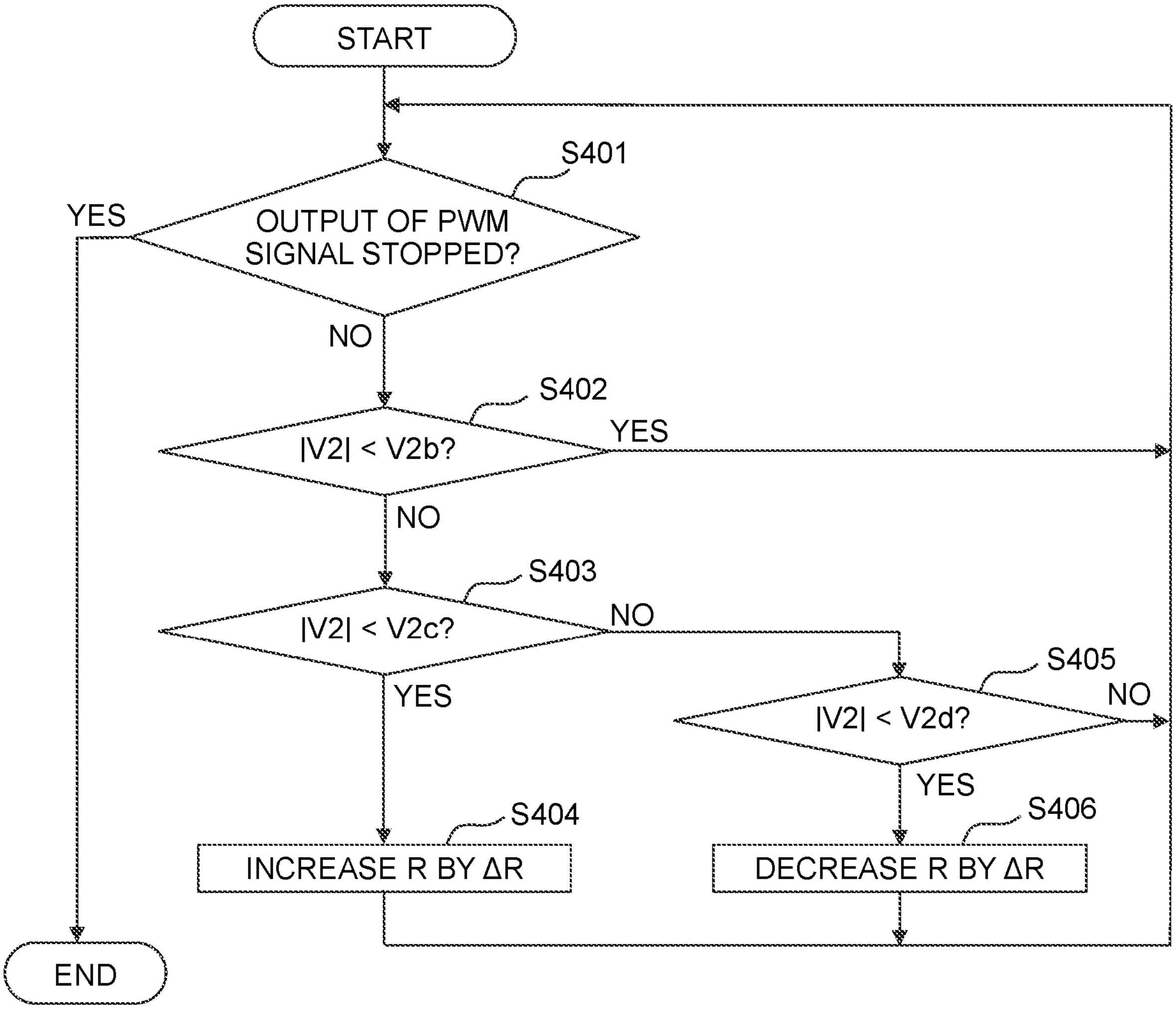
Figure 15B:
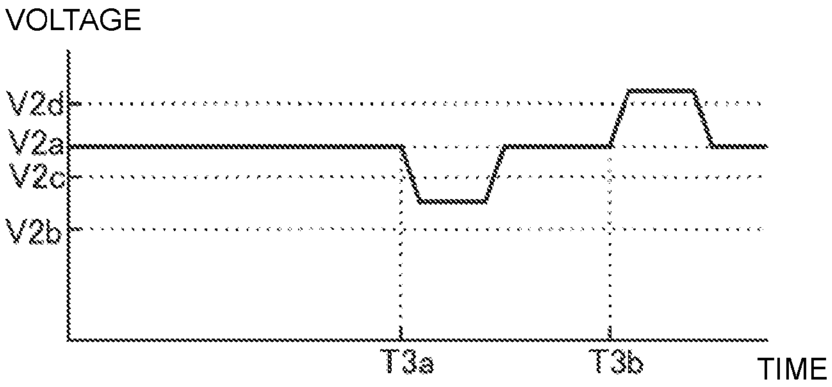

FIG. 15A is a flow chart illustrative of a flow of a process to change the rate R of the PWM signal on the basis of the first short circuit signal outputted from the first short circuit output part. FIG. 15B is a drawing illustrative of the change of the magnitude of the voltage of the first short circuit signal depending on the leak current and the change of the magnitude of the voltage of the first short circuit signal provided when the rate R of the PWM signal is changed in accordance with the change of the magnitude of the voltage of the first short circuit signal.

Figures 16A, 16B:
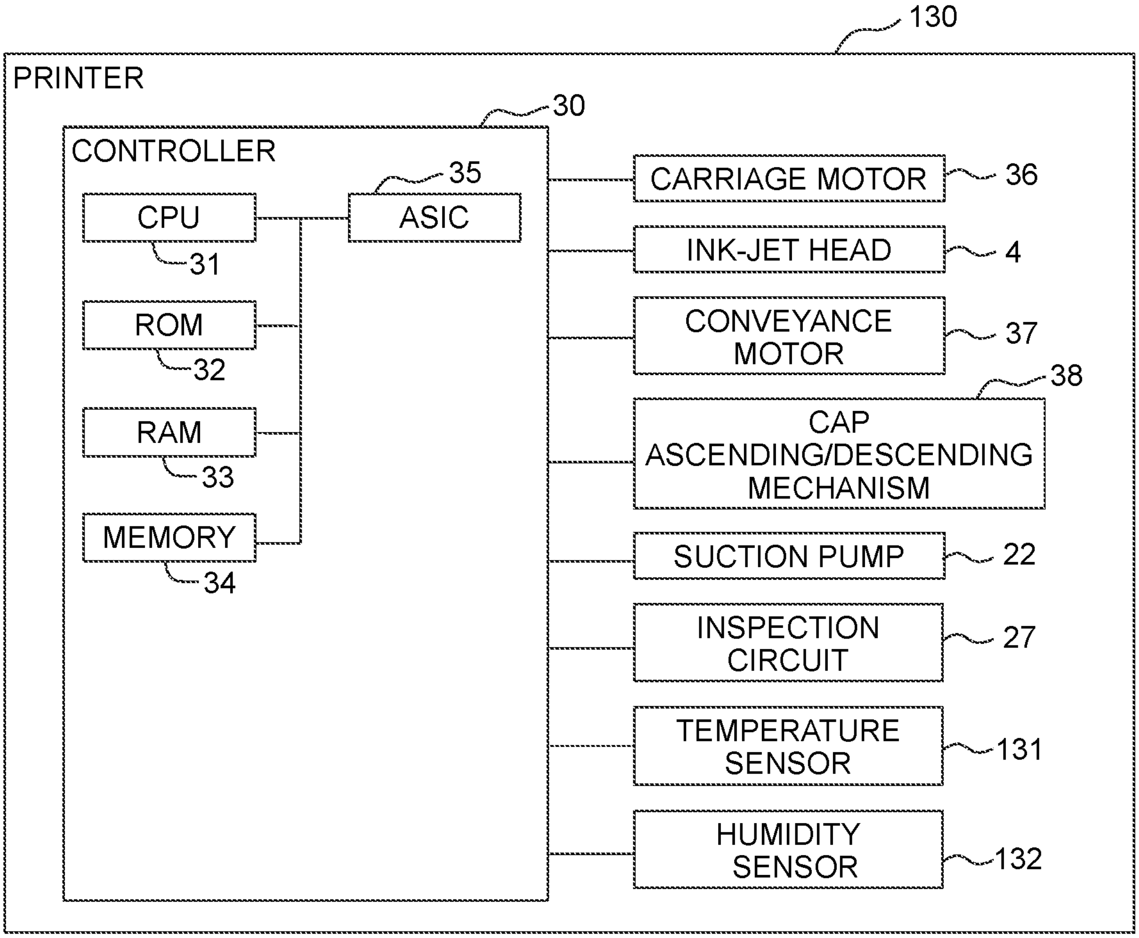

FIG. 16A is a block diagram illustrative of electric configuration of a printer provided with a temperature sensor and a humidity sensor. FIG. 16B is a drawing illustrative of a table in which the temperature, the humidity, and the rate R are associated with each other.

Figure 17:
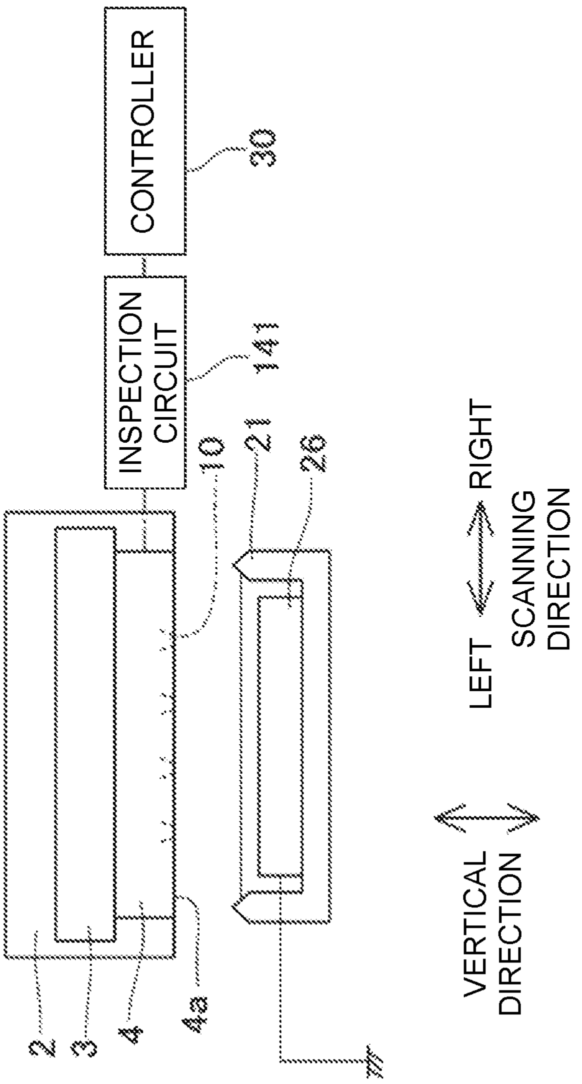

FIG. 17 is a drawing illustrative of an example in which the inspection circuit is connected to the ink-jet head, and the electrode in the cap is retained at the ground electric potential.

Figure 18:
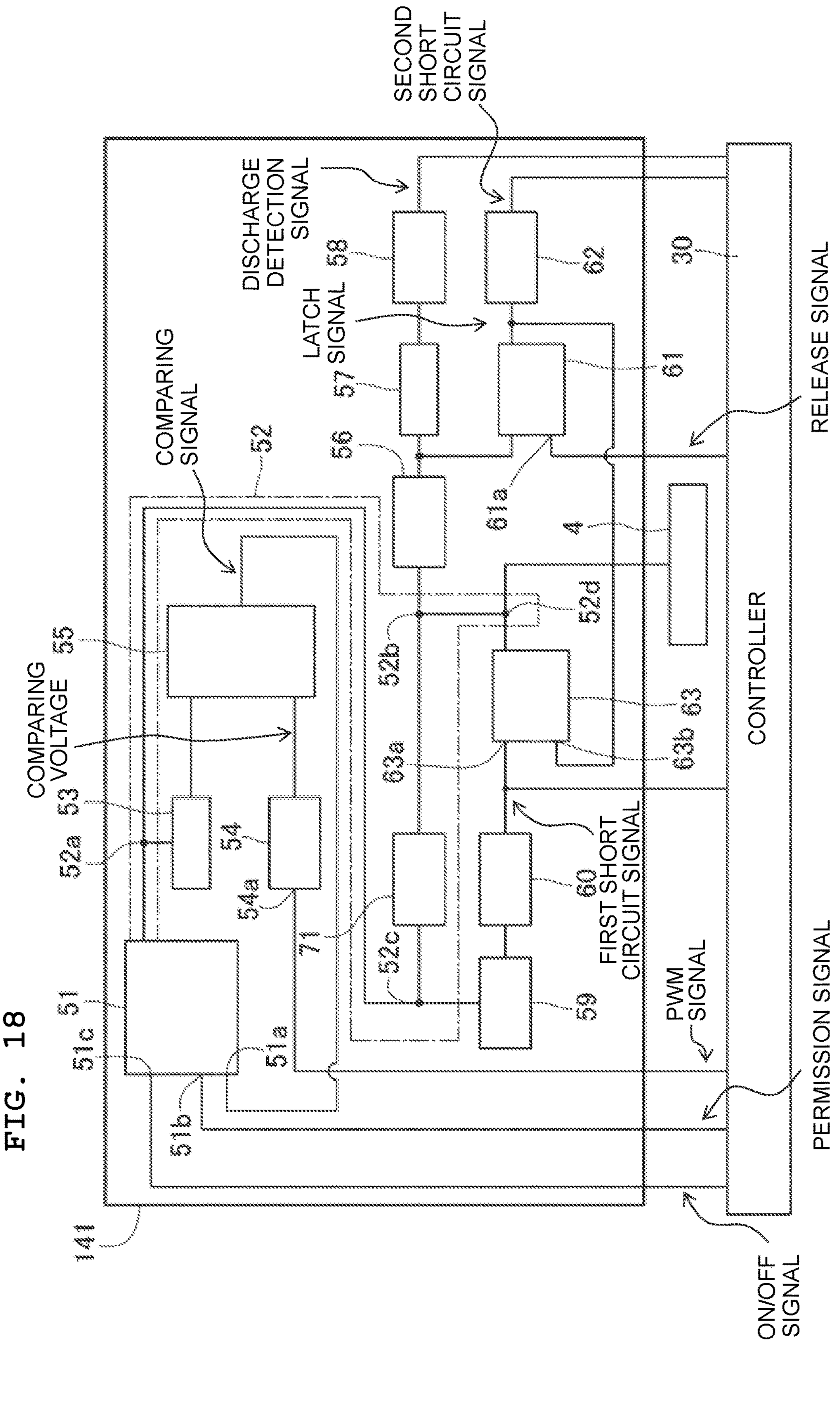

FIG. 18 is a drawing illustrative of configuration of the inspection circuit depicted in FIG. 17.

Figure 19A:
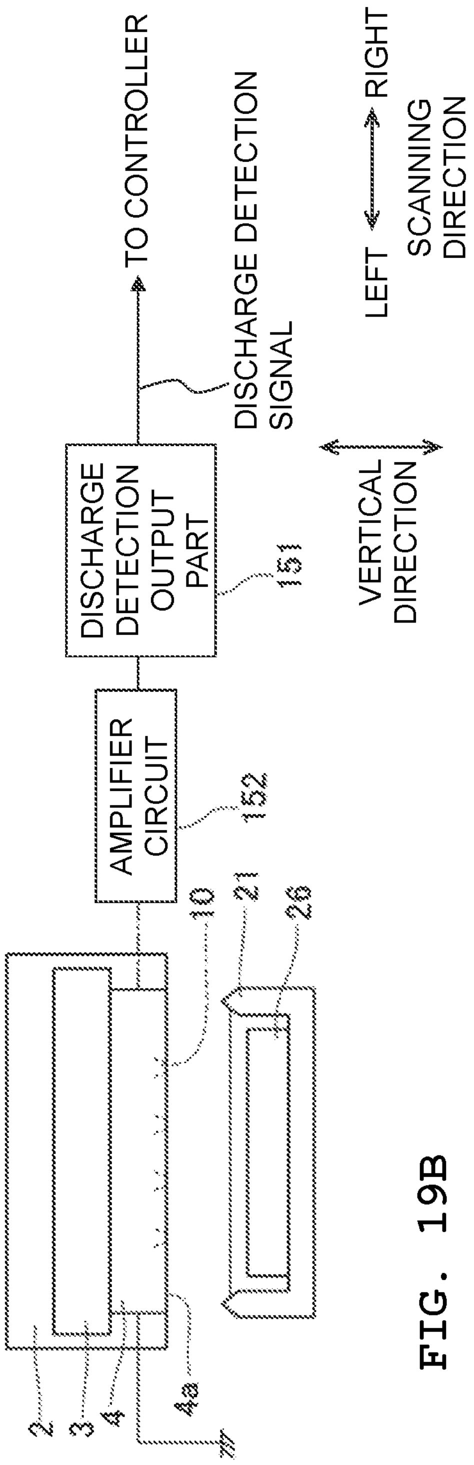
Figure 19B:
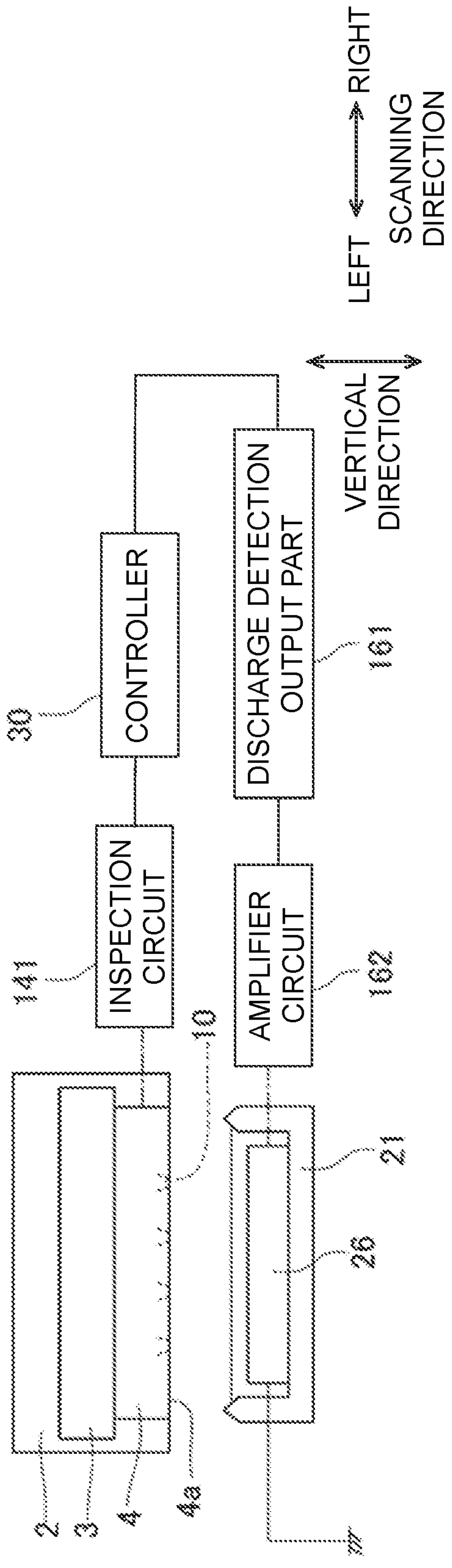

FIG. 19A is a drawing illustrative of an example in which the voltage is applied to the electrode in the cap and the discharging detection output part is connected to the ink-jet head. FIG. 19B is a drawing illustrative of an example in which the inspection circuit is connected to the ink-jet head, the electrode in the cap is retained at the ground electric potential, and the discharging detection output part is connected to the electrode.

FIRST EMBODIMENT

A first embodiment of the present disclosure will be explained below.

<Overall Configuration of Printer>

Figure 1:
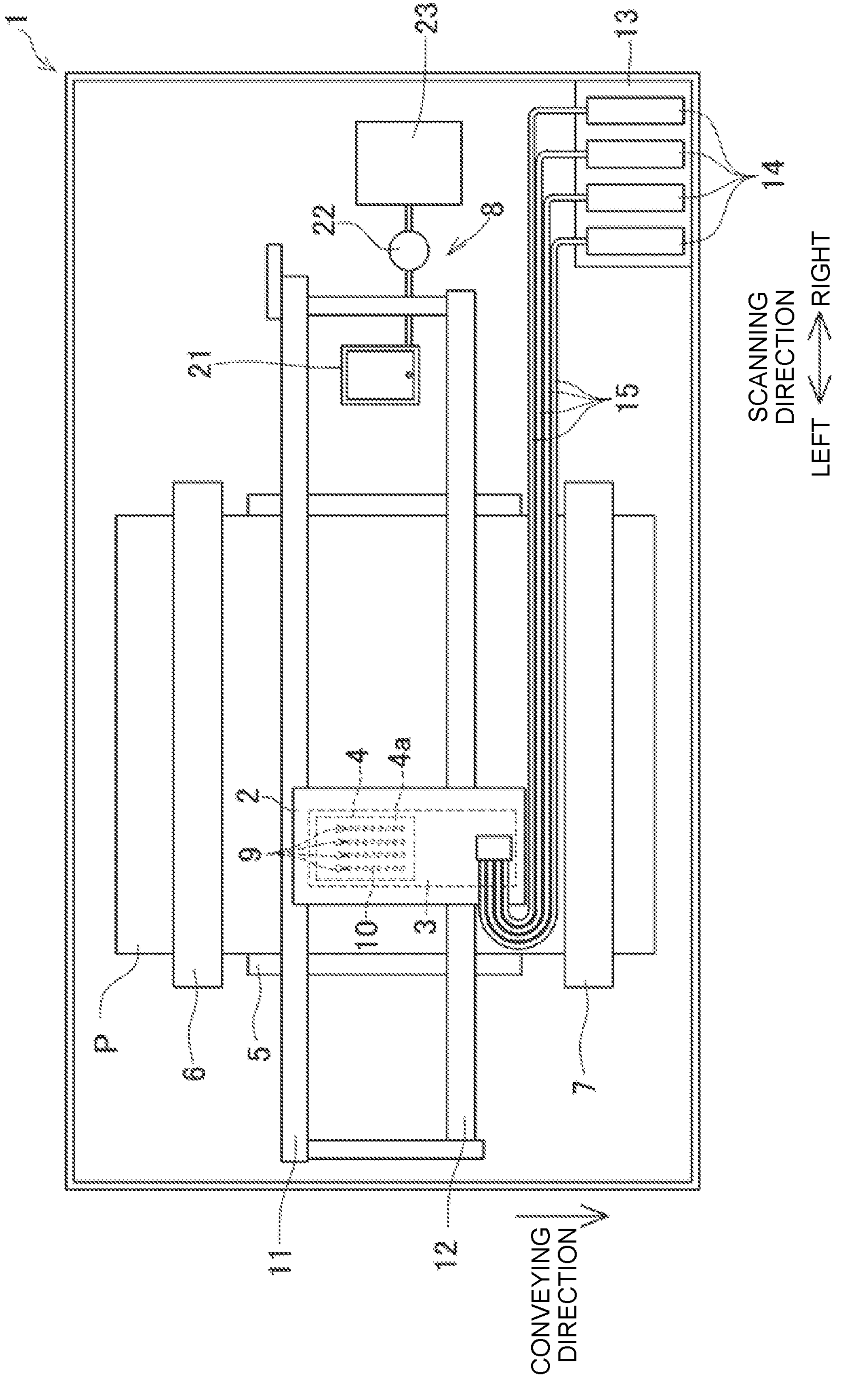
FIG. 1 is a schematic drawing illustrative of a printer.

As depicted in FIG. 1, a printer 1 (an example of the "liquid discharging apparatus" of an aspect of the invention) according to the first embodiment comprises, for example, a carriage 2, a subtank 3, an ink-jet head 4 (an example of the "liquid discharging head" of an aspect of the invention), a platen 5, conveying rollers 6, 7, and a maintenance unit 8.

The carriage 2 is supported by two guide rails 11, 12 which extend in the scanning direction. The carriage 2 is connected to a carriage motor 36 (see FIG. 3) by the aid of, for example, an undepicted belt. When the carriage motor 36 is driven, the carriage 2 is moved in the scanning direction along the guide rails 11, 12. Note that the following explanation will be made while defining the right and the left in the scanning direction as depicted in FIG. 1.

The subtank 3 is carried on the carriage 2. In this case, the printer 1 is provided with a cartridge holder 13. Four ink cartridges 14 are removably installed to the cartridge holder 13. The four ink cartridges 14 are aligned in the scanning direction. Black, yellow, cyan, and magenta inks (an example of the "liquids" of an aspect of the invention) are stored in the four ink cartridges 14, respectively, in this order from the rightmost ink cartridge 14 in the scanning direction. The subtank 3 is connected to the four ink cartridges 14 installed to the cartridge holder 13 via four tubes 15. Accordingly, the four color inks as described above are supplied from the four ink cartridges 14 to the subtank 3.

The ink-jet head 4 is carried on the carriage 2, and the ink-jet head 4 is connected to the lower end portion of the subtank 3. The four color inks as described above are supplied from the subtank 3 to the ink-jet head 4. Further, the ink-jet head 4 discharges the inks from a plurality of nozzles 10 which are formed on a nozzle surface 4*a* as the lower surface of the ink-jet head 4. This configuration will be explained in more detail below. The plurality of nozzles 10 are arranged in the conveying direction orthogonal to the scanning direction, and thus the plurality of nozzles 10 form nozzle arrays 9. The four nozzle arrays 9 are aligned in the scanning direction on the nozzle surface 4*a*. The black, yellow, cyan, and magenta inks are discharged from nozzles 10 of the four nozzle arrays 9, respectively, in this order from the rightmost nozzle array 9 in the scanning direction.

The platen 5 is arranged under or below the ink-jet head 4, and the platen 5 is opposed to the plurality of nozzles 10. The platen 5 extends over the entire length of the recording paper P in the scanning direction, and the platen 5 supports the recording paper P from the lower position. The conveying roller 6 is arranged on the upstream in the conveying direction from the ink-jet head 4 and the platen 5. The conveying roller 7 is arranged on the downstream in the conveying direction from the ink-jet head 4 and the platen 5. The conveying rollers 6, 7 are connected to a conveyance motor 37 (see FIG. 3), for example, via undepicted gears. When the conveyance motor 37 is driven, then the conveying rollers 6, 7 are rotated, and the recording paper P is conveyed in the conveying direction.

The maintenance unit 8 is provided with a cap 21, a suction pump 22, and a waste liquid tank 23. The cap 21 is arranged on the right in the scanning direction as compared with the platen 5. Then, when the carriage 2 is positioned at the maintenance position disposed on the right in the scanning direction as compared with the platen 5, the plurality of nozzles 10 face or are opposed to the cap 21.

Figure 3:
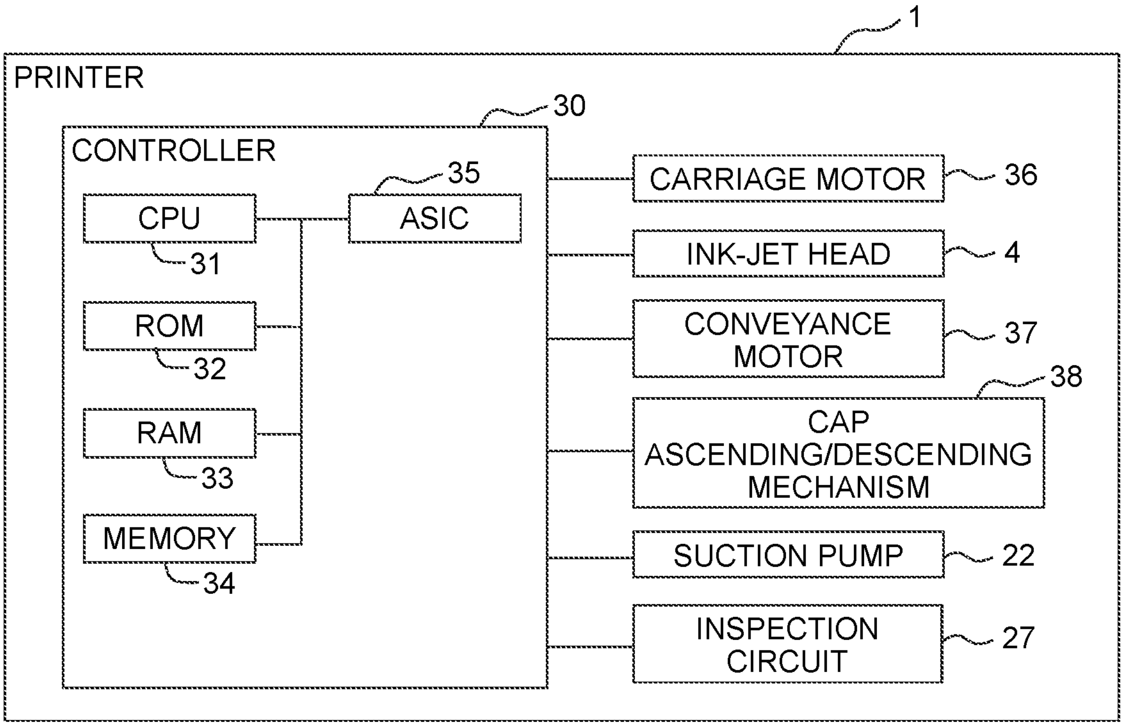
FIG. 3 is a block diagram illustrative of electric configuration of the printer.

Further, the cap 21 can ascend/descend by means of a cap ascending/descending mechanism 38 (see FIG. 3). Then, when the cap 21 is moved upwardly by means of the cap ascending/descending mechanism 38 in a state in which the plurality of nozzles 10 are opposed to the cap 21 by positioning the carriage 2 at the maintenance position described above, then the upper end portion of the cap 21 is brought in tight contact with the nozzle surface 4*a*, and a capped state is given such that the plurality of nozzles 10 are covered with the cap 21. Further, in a state in which the cap 21 is moved downwardly by means of the cap ascending/descending mechanism 38, an uncap state is given such that the plurality of nozzles 10 are not covered with the cap 21. Note that the present disclosure is not limited to the configuration in which the cap 21 covers the plurality of nozzles 10 by making tight contact with the nozzle surface 4*a*. The cap 21 may cover the plurality of nozzles 10, for example, by making tight contact with an undepicted frame or the like which is arranged around the nozzle surface 4*a* of the ink-jet head 4.

The suction pump 22 is a tube pump or the like which is connected to the cap 21 and the waste liquid tank 23. Then, the maintenance unit 8 can perform the so-called suction purge in which the inks contained in the ink-jet head 4 are drained from the plurality of nozzles 10 when the suction pump 22 is driven in the capped state as described above. The inks, which are drained by the suction purge, are stored in the waste liquid tank 23.

Note that the explanation has been made in this section for the purpose of convenience assuming that the cap 21 collectively covers all of the nozzles 10 and the inks contained in the ink-jet head 4 are drained from all of the nozzles 10 in the suction purge. However, there is no limitation thereto. For example, the following configuration is also available. That is, the cap 21 is separately provided with a portion which covers the plurality of nozzles 10 for constructing the nozzle array 9 disposed on the rightmost for discharging the black ink, and a portion which covers the plurality of nozzles 10 for constructing the three nozzle arrays 9 disposed on the left for discharging the color inks (inks of yellow, cyan, and magenta). Any one of the black ink and the color inks contained in the ink-jet head 4 can be selectively drained in the suction purge. Alternatively, the following configuration is also available. That is, the caps 21 are individually provided for each of the nozzle arrays 9. The inks can be discharged individually from the nozzles 10 of each of the nozzle arrays 9 in the suction purge.

Further, in the maintenance unit 8, it is possible to perform the so-called empty suction in which the inks, which are pooled in the cap 21, for example, on account of the suction purge and/or the inspection driving as described later on, are drained, when the suction pump 22 is driven in the uncap state. The inks, which are drained from the cap 21 by means of the empty suction, are also pooled in the waste liquid tank 23.

Figure 2:
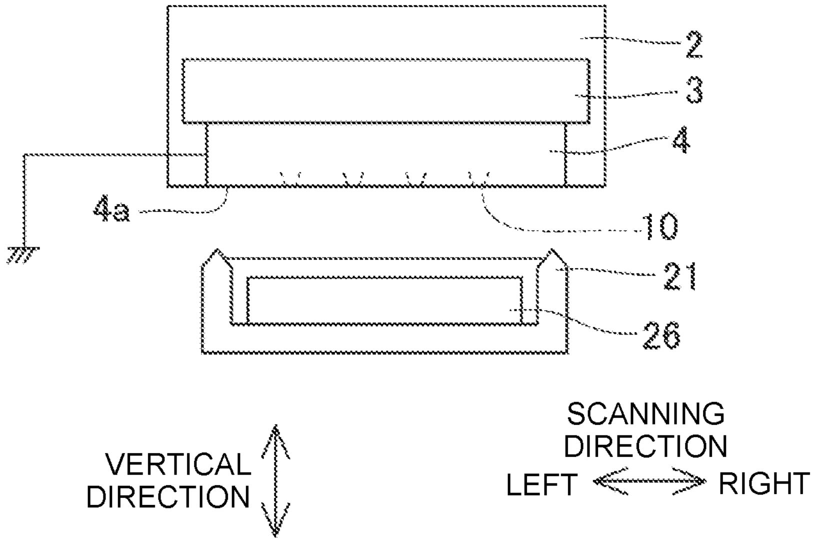
FIG. 2 is a drawing illustrative of, for example, an electrode arranged in a cap.

Further, as depicted in FIG. 2, an electrode 26, which has a rectangular planar shape, is arranged in the cap 21. The electrode 26 constitutes an inspection circuit (a circuit for inspection) 27 (see FIGS. 3 and 4) as described later on. The inspection circuit 27 is controlled by a controller 30 (see FIGS. 3 and 4). Then, in the first embodiment, it is possible to determine whether or not the inks are discharged from the nozzles 10 on the basis of the change of the voltage of the electrode 26 provided when the ink-jet head 4 is allowed to perform the inspection driving (driving for inspection) for discharging the inks from the nozzles 10 in a state in which the capped state as described above is given and the electric potential difference is generated between the ink-jet head 4 and the electrode 26 as described later on.

<Electric Configuration of Printer>

Next, the electric configuration of the printer 1 will be explained. As depicted in FIG. 3, the printer 1 is provided with the controller 30. The controller 30 is composed of, for example, CPU (Central Processing Unit) 31, ROM (Read Only Memory) 32, RAM (Random Access Memory) 33, a memory 34, and ASIC (Application Specific Integrated Circuit) 35. The controller 30 controls the operations of, for example, the carriage motor 36, the ink-jet head 4, the conveyance motor 37, the cap ascending/descending mechanism 38, the suction pump 22, and the inspection circuit 27. Further, the controller 30 receives the signal from the inspection circuit 27.

Note that as for the controller 30, only CPU 31 may perform various processings, only ASIC 35 may perform various processings, or CPU 31 and ASIC 35 may perform various processings in a cooperated manner. Further, as for the controller 30, one CPU 31 may perform the processing alone, or a plurality of CPU's 31 may perform the processing in a shared manner. Further, as for the controller 30, one ASIC 35 may perform the processing alone, or a plurality of ASIC's 35 may perform the processing in a shared manner.

<Inspection Circuit>

Figure 4:
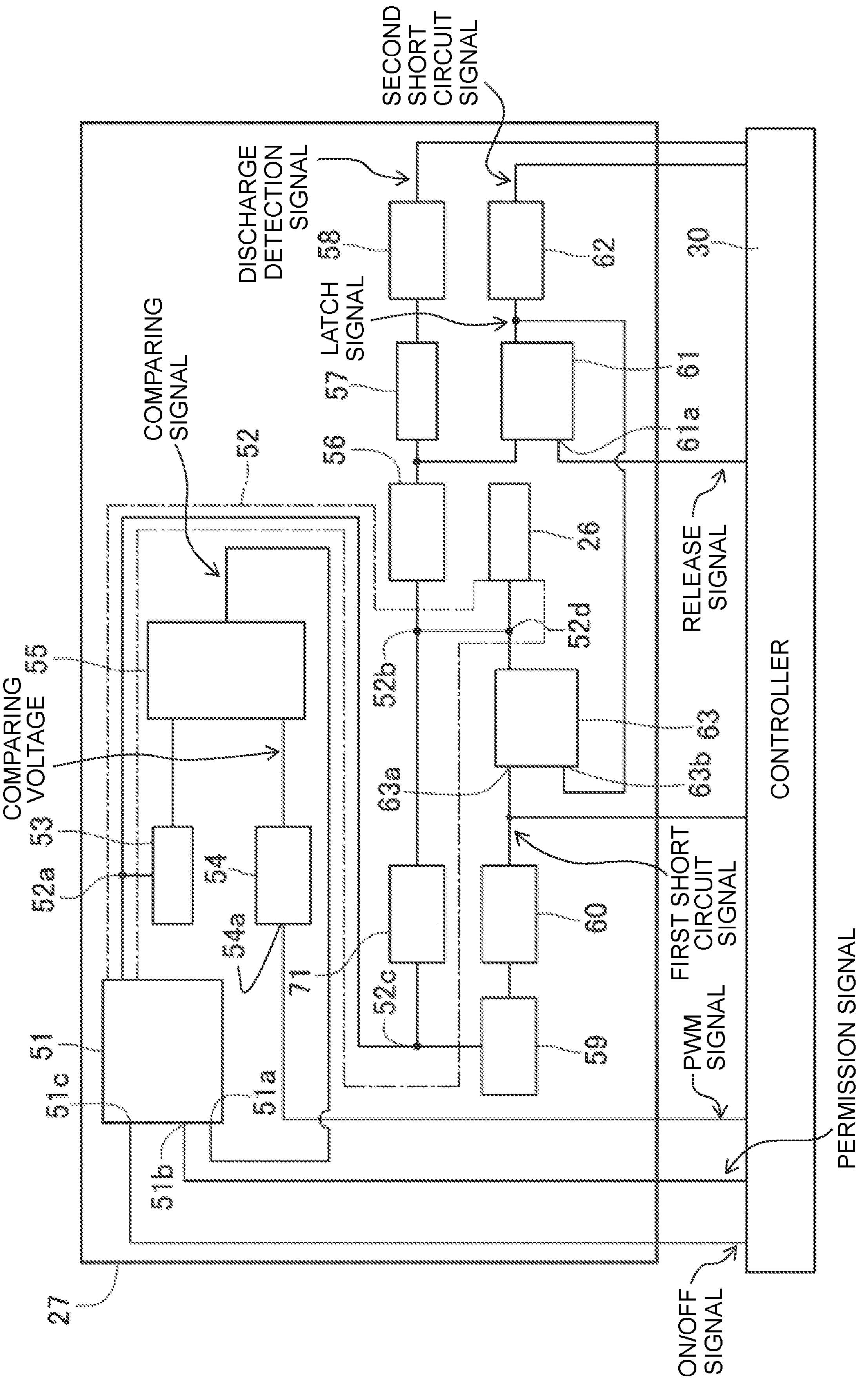
FIG. 4 is a block diagram illustrative of configuration of an inspection circuit.

Next, the inspection circuit 27 will be explained. As depicted in FIG. 4, the inspection circuit 27 comprises the electrode 26 described above, a voltage supply circuit 51 (an example of the "voltage supplier" of an aspect of the invention), a main circuit 52, a voltage division circuit 53, a comparing voltage generating circuit 54, a comparing circuit 55, a high pass filter 56, an amplifier circuit 57, a discharging detection output part 58 (an example of the "first output part" of an aspect of the invention), a low pass filter 59 (an example of the "another low pass filter" of an aspect of the invention), a first short circuit output part 60, a latch circuit 61, a second short circuit output part 62, and an electric discharge circuit 63. Note that in the first embodiment, the combination of the voltage division circuit 53, the comparing voltage generating circuit 54, and the comparing circuit 55 corresponds to an example of the "voltage comparer" of an aspect of the invention. Further, in the first embodiment, the first short circuit output part 60 and the second short circuit output part 62 correspond to examples of the "second output part" of an aspect of the invention.

The voltage supply circuit 51 is provided to generate the electric potential difference between the ink-jet head 4 and the electrode 26 by applying the voltage to the electrode 26. The voltage supply circuit 51 adjusts the voltage to be outputted by switching the execution of the boosting to raise the voltage to be outputted and the stop of the boosting as described later on. The operation of the voltage supply circuit 51 will be explained in detail later on.

Further, the voltage supply circuit 51 has a comparing signal receiving part 51*a*, a permission signal receiving part 51*b*, and an ON/OFF signal receiving part 51*c*.

The comparing signal receiving part 51*a* is the portion which receives the comparing signal outputted from the comparing circuit 55 as described later on. The permission signal receiving part 51*b* is the portion which receives the permission signal outputted from the controller 30. The permission signal is the signal which indicates whether or not the execution of the boosting is permitted in the voltage supply circuit 51. The ON/OFF signal receiving part 51*c* is the portion which receives the ON/OFF signal outputted from the controller 30. The ON/OFF signal is the signal which indicates that the voltage supply circuit 51 is to be either an ON state or an OFF state, the ON state being a state in which the voltage supply circuit 51 is capable of executing the boosting, the OFF state being a state in which the voltage supply circuit 51 is incapable of executing the boosting.

The main circuit 52 is the circuit which connects the voltage supply circuit 51 and the electrode 26. A low pass filter 71 is connected to the portion of the main circuit 52 disposed between the voltage supply circuit 51 and the electrode 26. The low pass filter 71 is the filter which gradually diminishes the component of the frequency higher than the cutoff frequency in the voltage fluctuation on the voltage supply circuit 51 side of the main circuit 52 being upstream of the voltage supply from the low pass filter 71 with respect to the electrode 26 side of the main circuit 52 being downstream of the voltage supply from the low pass filter 71. That is, the DC component of the voltage inputted from the downstream of the voltage supply is mainly outputted to the upstream of the voltage supply via the low pass filter 71.

The voltage division circuit 53 is connected to the junction 52*a* of the main circuit 52 disposed between the voltage supply circuit 51 and the low pass filter 71. The voltage division circuit 53 outputs the voltage Vd obtained by dividing, at a predetermined ratio, the voltage V outputted from the voltage supply circuit 51. The voltage Vd, which is outputted from the voltage division circuit 53, is the voltage which has the magnitude capable of being inputted into the comparing circuit 55.

The comparing voltage generating circuit 54 generates the comparing voltage Vda which is provided to be compared with the voltage Vd outputted from the voltage division circuit 53. The comparing voltage Vda is the voltage which corresponds to the predetermined voltage Va. In particular, the magnitude |Vda| of the comparing voltage Vda is the magnitude |Vd| of the voltage Vd outputted from the voltage division circuit 53 when the magnitude |V| of the voltage V outputted from the voltage supply circuit 51 is the magnitude |Va| of the predetermined voltage Va. In other words, the magnitude |Vda| of the comparing voltage Vda is set so that the magnitude |V| of the voltage V outputted from the voltage supply circuit 51 is the magnitude |Va| of the predetermined voltage Va. The comparing voltage generating circuit 54 has a PWM signal receiving part 54*a* which receives the PWM (Pulse Width Modulation) signal outputted from the controller 30. The comparing voltage generating circuit 54 generates the comparing voltage on the basis of the PWM signal received by the PWM signal receiving part 54*a*. Specifically, the comparing voltage generating circuit 54 generates the comparing voltage Vda which has a larger magnitude when the rate R of High for the value of the PWM signal is higher.

The comparing circuit 55 is electrically connected to the voltage division circuit 53, the comparing voltage generating circuit 54, and the voltage supply circuit 51. The comparing circuit 55 compares the magnitude |Vd| of the voltage Vd outputted from the voltage division circuit 53 with the magnitude |Vda| of the comparing voltage Vda outputted from the comparing voltage generating circuit 54, and the comparing circuit 55 outputs a comparing signal corresponding to the obtained result to the voltage supply circuit 51. That is, the comparing signal is the signal which indicates whether or not the magnitude |Vd| of the voltage Vd outputted from the voltage division circuit 53 is larger than the magnitude |Vda| of the comparing voltage Vda. The comparing signal, which is outputted from the comparing circuit 55, is received by the comparing signal receiving part 51*a* of the voltage supply circuit 51.

An explanation will now be made about the operation of the voltage supply circuit 51. If the permission signal, which is received by the permission signal receiving part 51*b*, indicates that the execution of the boosting in the voltage supply circuit 51 is permitted, and if the ON/OFF signal, which is received by the ON/OFF signal receiving part 51*c*, indicates that the voltage supply circuit 51 is to be in the ON state, then the voltage supply circuit 51 switches the execution of the boosting and the stop of the boosting, on the basis of the comparing signal. Specifically, the voltage supply circuit 51 performs the boosting if the comparing signal indicates that |Vd| is not more than |Vda|. On the other hand, if the comparing signal indicates that |Vd| is larger than |Vda|, the voltage supply circuit 51 stops the boosting. Accordingly, the magnitude |Vd| of the voltage Vd outputted from the voltage division circuit 53 is retained to be the magnitude |Vda| of the comparing voltage Vda. Then, the magnitude |V| of the voltage V outputted from the voltage supply circuit 51 is retained to be the magnitude |Va| of the predetermined voltage Va.

In this context, the predetermined voltage Va is the positive voltage of, for example, about 500 V. The comparing voltage Vda is the positive voltage of, for example, about 1.7 V. In this case, the voltages V, Vd are the voltages which are not less than 0 V. Alternatively, the predetermined voltage Va may be the negative voltage of, for example, about −500 V. The comparing voltage Vda may be the negative voltage of, for example, about −1.7 V. In this case, the voltages V, Vd are the voltages which are not more than 0 V.

The high pass filter 56 is connected to a junction 52*b* of the main circuit 52 disposed between the electrode 26 and the low pass filter 71. The amplifier circuit 57 is connected to the high pass filter 56. The discharging detection output part 58 is connected to the amplifier circuit 57. That is, the amplifier circuit 57 is connected between the high pass filter 56 and the discharging detection output part 58. Further, the high pass filter 56 is connected between the voltage supply circuit 51 and the discharging detection output part (first output part) 58.

If the voltage fluctuation occurs at the electrode 26 disposed on the upstream of the voltage supply from the high pass filter 56, the DC component of the voltage (high voltage component applied by the voltage supply circuit 51) is removed by the high pass filter 56 on the downstream of the voltage supply from the high pass filter 56. The voltage, which passes through the high pass filter 56, is amplified by the amplifier circuit 57, and the voltage is outputted from the discharging detection output part 58. Accordingly, the signal, which is outputted from the discharging detection output part 58, is the signal in which the high frequency component of the voltage of the electrode 26 is amplified.

Here, an explanation will be made about the voltage of the electrode 26 provided when the inspection driving is performed in order to allow the ink-jet head 4 to discharge the inks from the nozzles 10 in a state in which the capped state as described above is given and the electric potential difference is generated between the ink-jet head 4 and the electrode 26 by applying the voltage to the electrode 26 by means of the voltage supply circuit 51. If the ink is not discharged from the nozzles 10 in accordance with the inspection driving, the voltage of the electrode 26 is scarcely changed. If the ink is discharged from the nozzle 10 in accordance with the inspection driving, the voltage of the electrode 26 is changed. Further, in this situation, the sudden change of the voltage of the electrode 26 is brought about. Therefore, the high frequency component of the voltage of the electrode 26 differs depending on whether or not the ink is discharged from the nozzles 10 in accordance with the inspection driving.

Accordingly, if the ink is not discharged from the nozzle 10 in accordance with the inspection driving, each of the signal outputted from the high pass filter 56 to the amplifier circuit 57 and the signal outputted from the discharging detection output part 58 is the signal in which the voltage scarcely changes from V0 as depicted in FIG. 5A. In this case, V0 is, for example, the voltage which is approximate to the ground electric potential.

On the other hand, if the ink is discharged from the nozzle 10 in accordance with the inspection driving, and the voltage of the electrode 26 is changed, then the signal, which is outputted from the high pass filter 56 to the amplifier circuit 57, is the signal in which the voltage is changed with respect to V0 as depicted in FIG. 5B. However, the amount of change of the voltage of the electrode 26, which is provided when the ink is discharged from the nozzle 10 in accordance with the inspection driving, is smaller than the amount of change of the voltage of the electrode 26 which is provided when the temporary short circuit is formed between the ink-jet head 4 and the electrode 26 as described later on. On this account, the signal, which is outputted from the high pass filter 56 to the amplifier circuit 57 when the ink is discharged from the nozzle 10 in accordance with the inspection driving, is also the signal in which the amount of change of the voltage is small as depicted in FIG. 5B.

Further, the signal, which is outputted from the discharging detection output part 58, is the signal which is obtained by amplifying the signal depicted in FIG. 5B as depicted in FIG. 5C. Therefore, the signal, which is outputted from the discharging detection output part 58, has the large voltage change as compared with the signal which is outputted from the high pass filter 56 to the amplifier circuit 57. Specifically, the signal, which is outputted from the discharging detection output part 58 when the ink is discharged from the nozzle 10 in accordance with the inspection driving, is the signal in which the maximum value Vh of the voltage V1 is larger than Vh1 (>V0), and the minimum value Vm of the voltage V1 is smaller than Vm1 (<V0).

As described above, the signal, which is outputted from the discharging detection output part 58, is the signal which indicates whether or not the ink is discharged from the nozzle 10 in accordance with the inspection driving. Further, the signal, which is outputted from the discharging detection output part 58, is the signal which is amplified by the amplifier circuit 57. Therefore, as for this signal, the amount of change of the voltage, which is provided when the ink is discharged from the nozzle 10 in accordance with the inspection driving, is large to some extent.

The low pass filter 59 is connected to a junction 52*c* of the main circuit 52 disposed between the voltage supply circuit 51 and the low pass filter 71. In this case, the junction 52*c* is also the portion of the main circuit 52 disposed between the voltage supply circuit 51 and the electrode 26. The first short circuit output part 60 is connected to the low pass filter 59. Accordingly, the first embodiment is configured such that the first short circuit output part 60 is connected to the junction 52*c*, and the low pass filter 59 is connected between the junction 52*c* and the first short circuit output part 60.

The first short circuit signal, which is outputted from the first short circuit output part 60, is the signal from which the high frequency component is removed by the low pass filters 59, 71 with respect to the fluctuation of the voltage of the electrode 26. That is, the first short circuit signal, which is outputted from the first short circuit output part 60, is principally the signal of the DC component of the voltage of the electrode 26.

In this context, for example, the continuous short circuit is formed in some cases between the ink-jet head 4 and the electrode 26 on account of the connection between the ink-jet head 4 and the electrode 26 via the ink contained in the cap 21. The formation of the continuous short circuit between the ink-jet head 4 and the electrode 26 means that the state, in which the ink-jet head 4 and the electrode 26 form the short circuit, continues, and the leak current continuously flows between the ink-jet head 4 and the electrode 26. If the continuous short circuit is formed between the ink-jet head 4 and the electrode 26, the magnitude of the voltage of the electrode 26 is decreased on account of the continuous flow of the leak current between the ink-jet head 4 and the electrode 26.

On this account, as depicted in FIG. 6, the magnitude |V2| of the voltage V2 of the first short circuit signal outputted from the first short circuit output part 60 is approximately that of the voltage V2a (V2a>0) in the state in which the continuous short circuit is not formed between the ink-jet head 4 and the electrode 26. The magnitude |V2| of the voltage V2 of the first short circuit signal outputted from the first short circuit output part 60 is smaller than that of the voltage V2b (<V2a) in the state in which the continuous short circuit is formed between the ink-jet head 4 and the electrode 26. Accordingly, the first short circuit signal is the signal which indicates whether or not the continuous short circuit is formed between the ink-jet head 4 and the electrode 26. Note that FIG. 6 depicts such a case that the continuous short circuit is not formed between the ink-jet head 4 and the electrode 26 until the time T1, and the continuous short circuit is formed between the ink-jet head 4 and the electrode 26 after the time T1.

The latch circuit 61 is connected to the high pass filter 56 in parallel to the amplifier circuit 57. The second short circuit output part 62 is connected to the latch circuit 61. Accordingly, in this configuration, the second short circuit output part 62 is connected to the high pass filter 56 without allowing the amplifier circuit 57 to intervene therebetween, and the latch circuit 61 is connected between the high pass filter 56 and the second short circuit output part 62. The latch circuit 61 receives the signal in which the DC component (high voltage component applied by the voltage supply circuit 51) is removed from the voltage of the electrode 26 by the high pass filter 56. The latch circuit 61 is configured such that the signal is outputted from the latch circuit 61 if the voltage of not less than a predetermined voltage is inputted into the latch circuit 61, and the signal is not outputted from the latch circuit 61 if the voltage of less than the predetermined voltage is inputted into the latch circuit 61. Further, the latch circuit 61 has a circuit which maintains the output if the signal is once outputted. The latch circuit 61 is provided with a release signal receiving part 61*a* for receiving, from the controller 30, a release signal which instructs the release of the output. The maintenance of the output of the latch circuit 61 is continued until the release command is received from the controller 30.

In this context, for example, if the temporary short circuit is formed between the ink-jet head 4 and the electrode 26, for example, on account of any temporary occurrence of the electric discharge at the gap between the nozzle surface 4*a* and the ink contained in the cap 21, any temporary voltage change arises in the electrode 26. The formation of the temporary short circuit between the ink-jet head 4 and the electrode 26 means that the ink-jet head 4 and the electrode 26 temporarily form the short circuit, and the leak current temporarily flows between the ink-jet head 4 and the electrode 26. Further, the sudden temporary voltage change arises in the electrode 26 when the temporary short circuit is formed between the ink jet head 4 and the electrode 26. On this account, the high frequency component of the voltage of the electrode 26 differs depending on whether or not the temporary short circuit is formed between the ink-jet head 4 and the electrode 26. Further, the amount of change of the voltage of the electrode 26, which is provided in this situation, is larger than the amount of change of the voltage of the electrode 26 which is provided when the ink is discharged from the nozzle 10 in accordance with the inspection driving.

Therefore, if the temporary short circuit is not formed between the ink-jet head 4 and the electrode 26, as depicted in FIG. 7A, the voltage scarcely changes in the signal which is outputted from the high pass filter 56 and which is received by the latch circuit 61. In other words, the latch circuit 61 does not output any signal. On the other hand, if the temporary short circuit is formed between the ink-jet head 4 and the electrode 26, as depicted in FIG. 7B, the voltage temporarily changes in the signal which is received by the latch circuit 61. However, the change of the voltage occurs in a short period of time.

Then, if the voltage change, which is caused by the formation of the temporary short circuit between the ink-jet head 4 and the electrode 26, occurs in the signal received by the latch circuit 61, the latch circuit 61 outputs the signal. Further, the latch circuit 61 has the circuit to maintain the output, and hence the signal is continuously outputted. Accordingly, for example, as depicted in FIG. 7C, the latch signal is outputted from the latch circuit 61 as follows. That is, if the temporary short circuit is not formed between the ink-jet head 4 and the electrode 26, the signal has the voltage of V0. If the temporary short circuit is formed between the ink-jet head 4 and the electrode 26, the signal has the voltage of V3a (>V0). The output of the signal is maintained. That is, the latch signal, which is outputted from the latch circuit 61, is the signal which indicates whether or not the temporary short circuit is formed between the ink-jet head 4 and the electrode 26. Note that FIG. 7B and FIG. 7C depict the case in which the temporary short circuit is formed between the ink-jet head 4 and the electrode 26 at the time T2. Further, if the temporary short circuit is continuously formed between the ink-jet head 4 and the electrode 26, the latch signal, which is outputted from the latch circuit 61, continues the state in which the voltage is V3a. If it is determined that it is unnecessary to maintain the output from the latch circuit 61, the controller 30 outputs the release signal. The latch circuit 61 receives the release signal from the controller 30 at the release signal receiving part 61*a*. If the release signal is received, the latch circuit 61 stops the output of the latch signal. Note that FIG. 7C depicts the case in which the latch circuit 61 receives the release signal at the time T3 after the time T2. Further, the second short circuit signal, which is outputted from the second short circuit output part 62 connected to the latch circuit 61, is the same signal as the latch signal.

The electric discharge circuit 63 is connected to a junction 52*d* of the main circuit 52 disposed between the electrode 26 and the junction 52*b*. The junction 52*d* is also the portion of the main circuit 52 disposed between the electrode 26 and the low pass filter 71. Further, the junction 52*d* is disposed nearer to the electrode 26 as compared with the junction 52*c* of the main circuit 52 to which the first short circuit output part 60 is connected and the junction 52*b* to which the second short circuit output part 62 is connected. The electric discharge circuit 63 performs the electric discharge at the position near to the electrode 26 in order to quickly decrease the voltage of the electrode 26 without waiting for the decrease in the voltage supplied from the voltage supply circuit 51.

The electric discharge circuit 63 has a first short circuit signal receiving part 63*a* which receives the first short circuit signal outputted from the first short circuit output part 60, and a latch signal receiving part 63*b* which receives the signal outputted from the latch circuit 61. The first short circuit signal receiving part 63*a* is electrically connected to the first short circuit output part 60. Further, the latch signal receiving part 63*b* is electrically connected to the latch circuit 61. If the first short circuit signal, which is received by the first short circuit signal receiving part 63*a*, indicates that the continuous short circuit is formed between the ink-jet head 4 and the electrode 26, the electric discharge circuit 63 performs the electric discharge from the electrode 26. Further, if the latch signal, which is received by the latch signal receiving part 63*b*, indicates that the temporary short circuit is formed between the ink-jet head 4 and the electrode 26, the electric discharge circuit 63 also performs the electric discharge from the electrode 26.

<Process Upon Reception of Inspection Instruction Signal>

Next, an explanation will be made about the flow of the process of the controller 30 upon the reception of the inspection instruction signal to instruct the controller 30 to inspect whether or not the inks are discharged from the nozzles 10. In the first embodiment, for example, if the user operates, for example, an undepicted operation unit of the printer 1 or PC or the like connected to the printer, and the user instructs the controller 30 to inspect whether or not the inks are normally discharged from the nozzles 10, then the inspection instruction signal is sent from the operation unit of the printer 1 or PC or the like, and the controller 30 receives the inspection instruction signal. Then, if the inspection instruction signal is received, the controller 30 performs the process in accordance with the flow depicted in FIGS. 8A and 8B.

Note that at the point in time at which the flow depicted in FIGS. 8A and 8B is started, the ON/OFF signal, which is outputted from the controller 30, indicates that the voltage supply circuit 51 is to be in the OFF state. Further, the permission signal, which is outputted from the controller 30, indicates that the execution of the boosting in the voltage supply circuit 51 is not permitted. Further, at this point in time, the controller 30 does not output the PWM signal.

The flow depicted in FIG. 8 will be explained in more detail below. At first, the controller 30 executes the cap process (S101). In the cap process, the controller 30 controls the carriage motor 36 and the cap ascending/descending mechanism 38 to provide the capped state as described above. Note that if the capped state is given at the point in time at which the inspection instruction signal is received, the capped state is maintained in S101.

Subsequently, the controller 30 switches the ON/OFF signal into the signal which indicates that the voltage supply circuit 51 is to be in the ON state (S102). Subsequently, the controller 30 switches the permission signal into the signal which indicates that the boosting is permitted (S103). Subsequently, the controller 30 starts the output of the PWM signal (S104). In accordance with the processes of S102 to S104, the voltage supply circuit 51 switches the execution of the boosting and the stop of the boosting on the basis of the comparing signal as described above.

Accordingly, the boosting is performed in the voltage supply circuit 51 until the magnitude |Vd| of the voltage Vd outputted from the voltage division circuit 53 becomes the magnitude |Vda| of the comparing voltage Vda, i.e., until the magnitude |V| of the voltage V outputted from the voltage supply circuit 51 becomes the magnitude |Va| of the of the predetermined voltage Va. Then, the comparing signal, which is provided in accordance with the arrival of the magnitude |Vd| of the voltage Vd outputted from the voltage division circuit 53 at the magnitude |Vda| of the comparing voltage Vda, is received, and the boosting is stopped in the voltage supply circuit 51. As described above, the voltage supply circuit 51 repeats the boosting and the stop of the boosting on the basis of the comparing signal so that the magnitude |Vd| of the voltage Vd outputted from the voltage division circuit 53 is retained at the magnitude |Vda| of the comparing voltage Vda. That is, the magnitude |V| of the voltage V outputted from the voltage supply circuit 51 is retained at the magnitude |Va| of the predetermined voltage Va.

Subsequently, the controller 30 starts the discharging detection process after the voltage supplied to the electrode 26 becomes the predetermined voltage Va (S105). In the discharging detection process, the controller 30 successively allows the plurality of nozzles 10 of the ink-jet head 4 to perform the inspection driving respectively. Then, it is determined for each of the nozzles 10 whether or not the ink is normally discharged from the nozzle 10 on the basis of the discharging detection signal outputted from the discharging detection output part 58 when the inspection driving is performed. An obtained result is stored in the memory 34.

If the continuous short circuit is not formed between the ink-jet head 4 and the electrode 26 (S106: NO), and the temporary short circuit is not formed between the ink-jet head 4 and the electrode 26 (S107: NO), then the controller 30 continues the discharging detection process until the discharging detection process is completed (S108: NO). In this case, in S106, the controller 30 determines whether or not the continuous short circuit is formed between the ink-jet head 4 and the electrode 26 on the basis of the first short circuit signal outputted from the first short circuit output part 60. Further, in S107, the controller 30 determines whether or not the temporary short circuit is formed between the ink-jet head 4 and the electrode 26 on the basis of the second short circuit signal outputted from the second short circuit output part 62.

If the discharging detection process is completed (S108: YES), the controller 30 stops the output of the PWM signal (S109). Accordingly, the magnitude |Vda| of the comparing voltage Vd is decreased (for example, the ground electric potential is given). As a result, the boosting is not performed in the voltage supply circuit 51, and the magnitude |V| of the voltage V outputted from the voltage supply circuit 51 is gradually decreased. Finally, for example, the ground electric potential is given. That is, the output of the voltage from the voltage supply circuit 51 is stopped.

Subsequently, the controller 30 switches the permission signal into the signal which indicates that the boosting is not permitted (S110). Subsequently, the controller 30 switches the ON/OFF signal into the signal which indicates that the voltage supply circuit 51 is to be in the OFF state (S111).

On the other hand, if the continuous short circuit is formed between the ink-jet head 4 and the electrode 26 during the discharging detection process (S106: YES), or if the temporary short circuit is formed between the ink-jet head 4 and the electrode 26 during the discharging detection process (S107: YES), then the controller 30 interrupts the discharging detection process (S112). After executing the uncap process (S113), the controller 30 executes the processes of S109 to S111. In the uncap process of S113, the controller 30 provides the uncap state by moving the cap 21 downwardly by controlling the cap ascending/descending mechanism 38. Accordingly, the leak current hardly flows between the ink-jet head 4 and the electrode 26. The nozzles 10 are prevented from being damaged.

Further, if the continuous short circuit is formed between the ink-jet head 4 and the electrode 26 during the discharging detection process, the first short circuit signal, which is received by the first short circuit signal receiving part 63*a* of the electric discharge circuit 63, indicates that the continuous short circuit is formed between the ink-jet head 4 and the electrode 26. Accordingly, the electric discharge circuit 63 performs the electric discharge from the electrode 26. Further, if the temporary short circuit is formed between the ink-jet head 4 and the electrode 26 during the discharging detection process, the latch signal, which is received by the latch signal receiving part 63*b* of the electric discharge circuit 63, indicates that the temporary short circuit is formed between the ink-jet head 4 and the electrode 26. Accordingly, the electric discharge circuit 63 performs the electric discharge from the electrode 26. In the state in which the electric discharge circuit 63 performs the electric discharge from the electrode 26, the leak current hardly flows between the ink-jet head 4 and the electrode 26. Accordingly, the nozzles 10 are prevented from being damaged.

Further, after the process of S111, if the discharging detection process is not interrupted, i.e., if the discharging detection process is completed (S114: NO), then the controller 30 terminates the process. If the discharging detection process is interrupted (S114: YES), then the controller 30 executes the empty suction process (S115), and the controller 30 returns to S101. In the empty suction process, the controller 30 performs the empty suction by driving the suction pump 22 in the uncap state. Note that the following procedure is available in the discharging detection process which is to be started in S105 after the empty suction process in S115. That is, it may be determined whether or not the ink is discharged normally in relation to only each of the nozzles 10 other than the nozzles 10 for each of which it is already determined, before the interruption, whether or not the ink is discharged normally. Alternatively, it may be determined whether or not the inks are discharged normally in relation to all of the nozzles 10 of the ink-jet head 4.

<Effect>

In the first embodiment, the comparing circuit 55 outputs the comparing signal corresponding to whether or not the magnitude |V| of the voltage V outputted from the voltage supply circuit 51 is larger than the magnitude |Va| of the predetermined voltage Va. Then, if the comparing signal indicates that the magnitude |V| of the voltage V outputted from the voltage supply circuit 51 is not more than the magnitude |Va| of the predetermined voltage Va, the voltage supply circuit 51 performs the boosting. On the other hand, if the comparing signal indicates that the magnitude |V| of the voltage V outputted from the voltage supply circuit 51 is larger than the magnitude |Va| of the predetermined voltage Va, the voltage supply circuit 51 stops the boosting. Accordingly, the magnitude |V| of the voltage V outputted from the voltage supply circuit 51 can be stabilized to the magnitude |Va| of the predetermined voltage Va. Thus, it is possible to accurately determine whether or not the inks are normally discharged from the nozzles 10.

Further, in the first embodiment, the comparing circuit 55 is electrically connected to the comparing signal receiving part 51*a* of the voltage supply circuit 51. Therefore, the responsiveness is high. Accordingly, it is possible to further stabilize the voltage supplied from the voltage supply circuit 51, and thus, it is possible to accurately determine whether or not the inks are normally discharged from the nozzles 10.

Further, in the first embodiment, the magnitude |V| of the voltage V, which is outputted from the voltage supply circuit 51 when it is determined whether or not the inks are normally discharged from the nozzles 10, is, for example, about 500 V which is large. On the contrary, the magnitude of the voltage, which can be handled by the general comparing circuit, is, for example, about several V (Volt) which is small as compared with the magnitude |V| of the voltage V outputted from the voltage supply circuit 51.

Accordingly, in the first embodiment, the voltage, which is outputted from the voltage supply circuit 51, is divided by the voltage division circuit 53. Then, the signal, which corresponds to whether or not the magnitude |Vd| of the voltage Vd outputted from the voltage division circuit 53 is larger than the magnitude |Vda| of the comparing voltage Vda generated by the comparing voltage generating circuit 54, is outputted as the comparing signal. Accordingly, even when the magnitude |V| of the voltage V outputted from the voltage supply circuit 51 is large, it is possible to determine whether or not the magnitude |V| of the voltage V outputted from the voltage supply circuit 51 is larger than the magnitude |Va| of the predetermined voltage Va by using the general comparing circuit.

Further, in the first embodiment, the magnitude |Vda| of the comparing voltage Vda is easily made to be the desired magnitude by generating the comparing voltage on the basis of the PWM signal outputted from the controller 30.

Further, in the first embodiment, the boosting is performed only in such a situation that it is indicated that the magnitude |Vd| of the voltage Vd outputted from the voltage division circuit 53 is not more than the magnitude |Vda| of the comparing voltage Vda (the magnitude |V| of the voltage V outputted from the voltage supply circuit 51 is not more than the magnitude |Va| of the predetermined voltage Va), the permission signal indicates that the execution of the boosting is permitted, and the ON/OFF signal indicates that the voltage supply circuit 51 is to be in the ON state. Accordingly, it is possible to avoid any unintentional execution of the boosting which would be otherwise caused on account of, for example, any trouble and/or any malfunction of the circuit. Consequently, it is possible to secure the safety of the apparatus.

SECOND EMBODIMENT

Next, a second embodiment of the present disclosure will be explained. However, the configuration of the second embodiment is different from that of the first embodiment merely partially. Therefore, the following explanation will be principally made about the parts or components different from those of the first embodiment.

As depicted in FIG. 9, in the second embodiment, in relation to an inspection circuit (a circuit for inspection) 100, the comparing circuit 55 outputs a comparing signal to the controller 30. Further, the controller 30 outputs a control signal in order to control a voltage supply circuit 101 on the basis of the comparing signal. The controller 30 selectively outputs, as the control signal, a signal which instructs the voltage supply circuit 101 to execute the boosting and a signal which instructs the voltage supply circuit 101 to stop the boosting.

The voltage supply circuit 101 has a configuration in which the comparing signal receiving part 51*a* (see FIG. 4) of the voltage supply circuit 51 of the first embodiment is replaced with a control signal receiving part 101*a* which receives the control signal outputted from the controller 30. The voltage supply circuit 101 executes the boosting in such a situation that the ON/OFF signal indicates the provision of the ON state, the permission signal indicates the permission of the execution of the boosting, and the control signal which gives instruction to execute the boosting is received. Further, the voltage supply circuit 101 stops the boosting in such a situation that the ON/OFF signal indicates the provision of the OFF state, the permission signal does not indicate the permission of the execution of the boosting, or the control signal which gives instruction to stop the boosting is received.

Then, in the second embodiment, if the inspection instruction signal is received, the controller 30 performs the process in accordance with a flow depicted in FIG. 10 concurrently with the execution of the process in accordance with the flow depicted in FIGS. 8A and 8B in the same manner as the first embodiment.

The flow depicted in FIG. 10 will be explained in detail. The controller 30 determines whether or not the magnitude |Vd| of the voltage Vd outputted from the voltage division circuit 53 is not more than the magnitude |Vda| of the comparing voltage Vda on the basis of the comparing signal (S201). If the magnitude |Vd| of the voltage Vd is not more than the magnitude |Vda| of the comparing voltage Vda (S201: YES), the controller 30 outputs, to the voltage supply circuit 101, the control signal which instructs the voltage supply circuit 101 to perform the boosting (S202). If the magnitude |Vd| of the voltage Vd is larger than the magnitude |Vda| of the comparing voltage Vda (S201: NO), the controller 30 outputs, to the voltage supply circuit 101, the control signal which instructs the voltage supply circuit 101 to stop the boosting (S203).

If the discharging detection process is not completed (S204: NO) after the processes of S202 and S203, the controller 30 returns to S201. If the discharging detection process is completed (S204: YES), the process is terminated.

Accordingly, in the second embodiment, the execution and the stop of the boosting are switched on the basis of the control signal in the voltage supply circuit 101 during the period in which the discharging detection process is performed. Thus, the magnitude |Vd| of the voltage Vd outputted from the voltage division circuit 53 is retained at the magnitude |Vda| of the comparing voltage Vda in the same manner as explained in the first embodiment. As a result, the magnitude |V| of the voltage V outputted from the voltage supply circuit 101 is retained at the magnitude |Va| of the predetermined voltage Va.

<Effect>

In the second embodiment, the comparing circuit 55 outputs the comparing signal corresponding to whether or not the magnitude |V| of the voltage V outputted from the voltage supply unit 101 is larger than the magnitude |Va| of the predetermined voltage Va (whether or not the magnitude |Vd| of the voltage Vd outputted from the voltage division circuit 53 is larger than the magnitude |Vda| of the comparing voltage Vda). The controller 30 sends the control signal which indicates the execution or the stop of the boosting, on the basis of whether or not the comparing signal indicates that the magnitude |V| of the voltage V outputted from the voltage supply circuit 101 is larger than the magnitude |Va| of the predetermined voltage Va. The voltage supply circuit 101 switches the execution of the boosting and the stop of the boosting on the basis of the control signal. Accordingly, the magnitude |V| of the voltage V outputted from the voltage supply circuit 101 can be stabilized to the magnitude |Va| of the predetermined voltage Va. Thus, it is possible to accurately determine whether or not the inks are normally discharged from the nozzles 10.

Further, in the second embodiment, the comparing circuit 55 outputs the comparing signal to the controller 30, and the voltage supply circuit 101 receives the control signal at the control signal receiving part 101*a*. Therefore, it is unnecessary to connect the comparing circuit 55 and the voltage supply circuit 101 in the inspection circuit 100. It is possible to simplify the configuration of the inspection circuit 100.

Further, in the second embodiment, the boosting is performed only in such a situation that the control signal indicates the execution of the boosting, the permission signal indicates the permission of the execution of the boosting, and the ON/OFF signal indicates that the voltage supply unit is to be in the ON state. Accordingly, it is possible to avoid any unintentional execution of the boosting which would be otherwise caused on account of, for example, any trouble and/or any malfunction of the circuit. Thus, it is possible to secure the safety of the apparatus.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

MODIFIED EMBODIMENTS

In the first embodiment, the voltage supply circuit 51 has the ON/OFF signal receiving part 51*c*, the permission signal receiving part 51*b*, and the comparing signal receiving part 51*a*. Then, the voltage supply circuit 51 switches the execution of the boosting and the stop of the boosting on the basis of the comparing signal in only such a situation that the ON/OFF signal indicates that the voltage supply circuit 51 is to be in the ON state, and the permission signal indicates the permission of the boosting. However, there is no limitation thereto.

In a first modified embodiment, as depicted in FIG. 11, an inspection circuit (a circuit for inspection) 110 has a configuration in which the voltage supply circuit 51, which is included in the inspection circuit 27 of the first embodiment, is replaced with a voltage supply circuit 111. Unlike the voltage supply circuit 51, the voltage supply circuit 111 does not have the ON/OFF signal receiving part 51*c* (see FIG. 4). In the first modified embodiment, for example, the voltage supply circuit 111 is always in the ON state in a situation in which the power source of the printer is turned ON. Then, the voltage supply circuit 111 switches the execution of the boosting and the stop of the boosting on the basis of the comparing signal only when the permission signal indicates the permission of the boosting.

Further, in the first modified embodiment, the controller 30 performs the process in accordance with a flow depicted in FIGS. 12A and 12B when the inspection instruction signal is received. In the flow depicted in FIGS. 12A and 12B, the processes of S102 and S111 are removed from the flow depicted in FIGS. 8A and 8B.

In the first modified embodiment, the boosting is executed in only such a situation that it is indicated that the magnitude $|V|$ of the voltage V outputted from the voltage supply circuit 51 is not more than the magnitude $|Va|$ of the predetermined voltage Va (the magnitude $|Vd|$ of the voltage Vd outputted from the voltage division circuit 53 is not more than the magnitude $|Vda|$ of the comparing voltage Vda) and the permission signal indicates that the execution of the boosting is permitted. Accordingly, it is possible to avoid any unintentional execution of the boosting which would be otherwise caused on account of, for example, any trouble and/or any malfunction of the circuit. Thus, it is possible to secure the safety of the apparatus.

Further, in the first modified embodiment, the voltage supply circuit 111 switches the execution of the boosting and the stop of the boosting on the basis of the comparing signal only when the permission signal indicates the permission of the boosting. However, there is no limitation thereto. For example, it is also allowable that the voltage supply circuit does not have the permission signal receiving part. If the control signal is received, the execution of the boosting and the stop of the boosting may be always switched on the basis of the comparing signal.

Further, in the second embodiment, the voltage supply circuit 101 has the ON/OFF signal receiving part 51*c*, the permission signal receiving part 51*b*, and the control signal receiving part 101*a*. Then, the voltage supply circuit 101 switches the execution of the boosting and the stop of the boosting on the basis of whether the control signal instructs the voltage supply circuit 101 to execute the boosting or the control signal instructs the voltage supply circuit 101 to stop the boosting, only when the ON/OFF signal indicates that the voltage supply circuit 101 is to be in the ON state and the permission signal indicates the permission of the boosting. However, there is no limitation thereto.

In a second modified embodiment, as depicted in FIG. 13, an inspection circuit (a circuit for inspection) 120 has a configuration in which the voltage supply circuit 101 of the inspection circuit 100 of the second embodiment is replaced with a voltage supply circuit 121. Unlike the voltage supply circuit 101, the voltage supply circuit 121 does not have the ON/OFF signal receiving part 51*c* (see FIG. 9). In the second modified embodiment, the voltage supply circuit 121 is always in the ON state, for example, in a situation in which the power source of the printer is turned ON. Then, only when the permission signal indicates the permission of the boosting, the voltage supply circuit 121 switches the execution of the boosting and the stop of the boosting on the basis of whether the control signal instructs the voltage supply circuit 121 to execute the boosting or the control signal instructs the voltage supply circuit 121 to stop the boosting.

Further, in the second modified embodiment, if the inspection instruction signal is received, the controller 30 performs the process in accordance with the flows depicted in FIGS. 10A and 10B and FIGS. 12A and 12B in the same manner as the first modified embodiment.

In the second modified embodiment, the boosting is executed only when the control signal indicates the execution of the boosting and the permission signal indicates the permission of the execution of the boosting. Accordingly, it is possible to avoid any unintentional execution of the boosting which would be otherwise caused on account of, for example, any trouble and/or any malfunction of the circuit. Thus, it is possible to secure the safety of the apparatus.

Further, in the second modified embodiment, the voltage supply circuit 111 switches the execution of the boosting and the stop of the boosting on the basis of the control signal only when the permission signal indicates the permission of the boosting. However, there is no limitation thereto. For example, it is also allowable that the voltage supply circuit does not have the permission signal receiving part. The voltage supply circuit may always switch the execution of the boosting and the stop of the boosting on the basis of the control signal when the control signal is received.

Further, in the first and second embodiments, the comparing voltage is generated on the basis of the PWM signal received by the comparing voltage generating circuit 54. Accordingly, as explained below, the comparing voltage may be changed by changing the PWM signal outputted from the controller 30, depending on the condition.

In a third modified embodiment, the controller 30 changes the PWM signal by performing the process in accordance with a flow depicted in FIG. 14A. In the third modified embodiment, when the output of the PWM signal is started in S104, the process of the flow depicted in FIG. 14A is started.

The flow depicted in FIG. 14A will be explained in detail. The controller 30 performs the processes of S302 to S307 explained below until the output of the PWM signal is stopped in S108 (S301: NO). Then, if the output of the PWM signal is stopped in S109 (S301: YES), the process is terminated.

In S302, the controller 30 waits during the period in which the maximum value Vh of the voltage of the discharging detection signal outputted from the discharging detection output part 58 is not more than Vh1, or the minimum value Vm of the voltage of the discharging detection signal outputted from the discharging detection output part 58 is not less than Vm1 (S302: NO). In this case, the situation, in which the maximum value Vh is not more than Vh1 or the minimum value Vm is not less than Vm1, is a situation in which the inspection driving is not performed and a situation in which the inks are not discharged from the nozzles 10 by means of the inspection driving.

Then, if the maximum value Vh of the voltage of the discharging detection signal outputted from the discharging detection output part 58 is larger than Vh1, and the minimum value Vm of the voltage of the discharging detection signal outputted from the discharging detection output part 58 is smaller than Vm1 (S302: YES), then the controller 30 proceeds to S303. In this case, the situation, in which the maximum value Vh is larger than Vh1 and the minimum value Vm is smaller than Vm1, is the situation in which the ink is discharged from the nozzle 10 in accordance with the inspection driving.

In S303, the controller 30 determines whether or not the maximum value Vh is smaller than Vh2 (>Vh1). If the maximum value Vh is smaller than Vh2 (S303: YES), then the controller 30 increases the rate R (ratio R) of the time in which the value of the PWM signal is High by ΔR (S305), and the controller 30 returns to S301. Accordingly, the magnitude |Vda| of the comparing voltage Vda generated in the comparing voltage generating circuit 54 is increased.

If the maximum value Vh is not less than Vh2 (S303: NO), the controller 30 determines whether or not the minimum value Vm is larger than Vm2 (<Vm1). If the minimum value Vm is larger than Vm2 (S304: YES), the controller 30 proceeds to S305.

If the minimum value Vm is not more than Vm2 (S304: NO), the controller 30 determines whether or not the maximum value Vh is larger than Vh3 (>Vh2) and the minimum value Vm is smaller than Vm3 (<Vm2) (S306).

If the maximum value Vh is not more than Vh3, or the minimum value Vm is not less than Vm3 (S306: NO), then the controller 30 returns to S301 as it is. If the maximum value Vh is larger than Vh3, and the minimum value Vm is smaller than Vm3 (S306: YES), then the controller decreases the rate R of the time in which the value of the PWM signal is High by ΔR (S307), and the controller 30 returns to S301. Accordingly, the magnitude |Vda| of the comparing voltage Vda generated by the comparing voltage generating circuit 54 is decreased.

In this case, when the inspection driving is performed, if the maximum value Vh is larger than Vh1, and the minimum value Vm is smaller than Vm1 in relation to the discharging detection signal outputted from the discharging detection output part 58, then it is determined that the ink is discharged from the nozzle 10. Meanwhile, the relationship between the magnitude |V| of the voltage V outputted from the voltage supply circuit 51 and the maximum value Vh and the minimum value Vm of the voltage V1 of the discharging detection signal outputted from the discharging detection output part 58 when the ink is discharged from the nozzle 10 in accordance with the inspection driving differs in some cases depending on the environment and the influence of, for example, various errors of the printer. Then, for example, as depicted by a broken line in FIG. 14B, if the difference between the maximum value Vh and Vh1 and the difference between the minimum value Vm and Vm1 are excessively small, then the maximum value Vh is not more than Vh1 or the minimum value Vm is not less than Vm1 even when the ink is discharged from the nozzle 10 during the inspection driving performed thereafter. It is feared that any erroneous determination may be made such that the ink is not discharged from the nozzle 10. On the other hand, as depicted by an alternate long and short dash line in FIG. 14B, if the magnitude |Vh| of the maximum value Vh and the magnitude |Vm| of the minimum value Vm, which are provided when the ink is discharged from the nozzle 10 in accordance with the inspection driving, are excessively large, then the signal having a large voltage is inputted into the controller 30, and the signal becomes the cause of any trouble or the like. That is, when the ink is discharged from the nozzle 10 in accordance with the inspection driving, then the maximum value Vh is preferably within a certain range higher than Vh1 (for example, within a range of not less than Vh2 and not more than Vh3), and the minimum value Vm is preferably within a certain range lower than Vm2 (for example, within a range of not more than Vm2 and not less than Vm3).

In view of the above, in the third modified embodiment, as described above, the PWM signal is changed on the basis of the maximum value Vh and the minimum value Vm of the voltage V1 of the discharging detection signal outputted from the discharging detection output part 58 when the ink is discharged from the nozzle 10 in accordance with the inspection driving. Accordingly, the voltage outputted from the voltage supply circuit 51 is changed depending on the change of the PWM signal. As a result, the maximum value Vh and the minimum value Vm of the discharging detection signal outputted from the discharging detection output part 58 can be included in the appropriate range.

In a fourth modified embodiment, the controller 30 changes the PWM signal by performing the process in accordance with a flow depicted in FIG. 15A. In the fourth modified embodiment, the process of the flow depicted in FIG. 15A is started when the output of the PWM signal is started in S104.

The flow depicted in FIG. 15A will be explained in detail. The controller 30 performs the processes of S402 to S406 explained below until the output of the PWM signal is stopped in S109 (S401: NO). Then, when the output of the PWM signal is stopped in S109 (S401: YES), the process is terminated.

In S402, the controller 30 determines whether or not the magnitude |V2| of the voltage V2 of the first short circuit signal outputted from the first short circuit output part 60 is smaller than V2b. That is, the controller 30 determines whether or not the continuous short circuit is formed between the ink-jet head 4 and the electrode 26.

If the magnitude |V2| of the voltage V2 is smaller than V2b (S402: YES), the controller 30 returns to S401. Note that if the magnitude |V2| of the voltage V2 is smaller than V2b, then it is determined that the continuous short circuit is formed between the ink-jet head 4 and the electrode 26 as explained in the first embodiment, and the output of the PWM signal is stopped in S108. On this account, the process of the flow depicted in FIG. 15A is terminated.

Note that if the magnitude |V2| of the voltage V2 is not less than V2b (S402: NO), the controller 30 determines whether or not the magnitude |V2| of the voltage V2 of the first short circuit signal outputted from the first short circuit output part 60 is smaller than V2c (V2b<V2c<V2a) (S403). If the magnitude |V2| of the voltage V2 is smaller than V2c (S403: YES), then the controller 30 increases the rate R of the time in which the value of the PWM signal is High by ΔR (S404), and the controller 30 returns to S401. Accordingly, the magnitude |Vda| of the comparing voltage Vda generated in the comparing voltage generating circuit 54 is increased.

If the magnitude |V2| of the voltage V2 is not less than V2c (S403: NO), the controller 30 subsequently determines whether or not the magnitude |V2| of the voltage V2 is larger than V2d (>V2a) (S405). If the magnitude |V2| of the voltage V2 is not more than V2d (S405: NO), the controller 30 returns to S401. If the magnitude |V2| of the voltage V2 is larger than V2d (S405: YES), then the controller 30 decreases the rate R of the time in which the value of the PWM signal is High by ΔR (S406), and the controller 30 returns to S401. Accordingly, the magnitude |Vda| of the comparing voltage Vda generated in the comparing voltage generating circuit 54 is decreased.

In this case, if the continuous short circuit is formed between the ink-jet head 4 and the electrode 26, then the voltage V2 outputted from the first short circuit output part 60 is greatly lowered, and the magnitude |V2| of the voltage V2 is smaller than V2b. On the other hand, even when the continuous short circuit is not formed between the ink-jet head 4 and the electrode 26, it is difficult, in some cases, that the leak current flowing between the ink-jet head 4 and the electrode 26 is made to be completely zero.

Further, as explained in the third modified embodiment, when the inspection driving is performed, it is preferable that the maximum value Vh and the minimum value Vm of the voltage V1 of the discharging detection signal outputted from the discharging detection output part 58 are included in the certain range. On the contrary, the relationship between the magnitude |V| of the voltage V outputted from the voltage supply circuit 51 and the maximum value Vh and the minimum value Vm of the voltage of the discharging detection signal outputted from the discharging detection output part 58 is changed by the influence of the leak current flowing between the ink-jet head 4 and the electrode 26.

For example, if a slight leak current flows between the ink-jet head 4 and the electrode 26, the voltage V outputted from the first short circuit output part 60 is lowered. Further, the amount of decrease of the voltage, which is provided in this situation, is smaller than that provided when the continuous short circuit is formed between the ink-jet head 4 and the electrode 26. Further, when the time elapses, then the leak current is decreased in some cases, or the leak current becomes zero in other cases. In such situations, the voltage V outputted from the first short circuit output part 60 is raised.

In view of the above, in the fourth modified embodiment, as described above, the PWM signal is changed on the basis of the voltage V2 of the first short circuit signal outputted from the first short circuit output part 60. Accordingly, the voltage outputted from the voltage supply circuit 51 is changed in accordance with the change of the PWM signal. As a result, the maximum value Vh and the minimum value Vm of the voltage V1 of the discharging detection signal outputted from the discharging detection output part 58 can be included in the appropriate range.

For example, as depicted in FIG. 15B, if a leak current, which is smaller than the leak current that flows when the continuous short circuit is formed, begins to flow between the ink-jet head 4 and the electrode 26 at the time T3a, then the voltage V2, which is outputted from the first short circuit output part 60, is lowered, and the voltage V2 becomes a voltage within a range of V2b≤V2<V2c. In this situation, the rate R of the PWM signal is increased, and thus the voltage V2, which is outputted from the first short circuit output part 60, is raised to be not less than V2c.

Further, for example, if the leak current, which flows between the ink-jet head 4 and the electrode 26, is decreased or made to be zero at the time T3b thereafter, then the voltage V2, which is outputted from the first short circuit output part 60, is raised, and the voltage V2 becomes higher than V2d. In this situation, the rate R of the PWM signal is decreased. Thus, the voltage V2, which is outputted from the first short circuit output part 60, is lowered, and the voltage V2 becomes lower than V2d.

In a fifth modified embodiment, as depicted in FIG. 16A, a printer 130 is provided with a temperature sensor 131 and a humidity sensor 132 in addition to the constitutive components which are the same as or equivalent to those of the printer 1 of the first and second embodiments. Note that in the fifth modified embodiment, each of the temperature sensor 131 and the humidity sensor 132 correspond to an example of the “sensor” of an aspect of the invention.

For example, the temperature sensor 131 obtains the information about the temperature such as the surrounding air temperature, and the temperature sensor 131 outputs, to the controller 30, the temperature signal which indicates the obtained information about the temperature. For example, the humidity sensor 132 obtains the information about the humidity such as the surrounding humidity, and the humidity sensor 132 outputs, to the controller 30, the humidity signal which indicates the obtained information about the humidity. Further, in the fifth modified embodiment, as depicted in FIG. 16B, the memory 34 (an example of the “storage” of an aspect of the invention) stores a table (an example of the “association information” of an aspect of the invention) in which the ranges of the temperature X and the humidity Y are associated with the rate R of the time in which the value of the PWM signal is High.

Then, in the fifth modified embodiment, the controller 30 determines the rate R of the time in which the value of the PWM signal is High on the basis of the temperature X indicated by the temperature signal received from the temperature sensor 131, the humidity Y indicated by the humidity signal received from the humidity sensor 132, and the table depicted in FIG. 16B. The controller 30 outputs the PWM signal corresponding to the determined rate R.

As explained in the third modified embodiment, when the inspection driving is performed, it is preferable that the maximum value Vh and the minimum value Vm of the voltage of the discharging detection signal outputted from the discharging detection output part 58 are included in the certain range. Meanwhile, the relationship between the magnitude |V| of the voltage V outputted from the voltage supply circuit 51 and the maximum value Vh and the minimum value Vm of the voltage outputted from the discharging detection output part 58 differs in some cases depending on the influence of the temperature and the humidity.

In view of the above, in the fifth modified embodiment, the rate R of the time in which the value of the PWM signal is High is determined on the basis of the information about the temperature obtained by the temperature sensor 131, the information about the humidity obtained by the humidity sensor 132, and the table stored in the memory 34. Then, the comparing voltage is changed by outputting the PWM signal on the basis of the determined rate R. Accordingly, the maximum value Vh and the minimum value Vm of the voltage of the discharging detection signal outputted from the discharging detection output part 58 can be included in the appropriate range irrelevant to the influence of the temperature and the humidity.

Further, in the fifth modified embodiment, the printer 130 is provided with the temperature sensor 131 and the humidity sensor 132. The rate R in the PWM signal is determined by using the information about the temperature obtained by the temperature sensor 131 and the information about the humidity obtained by the humidity sensor 132. However, there is no limitation thereto. The printer may be provided with any one sensor of the temperature sensor 131 and the humidity sensor 132. The rate R in the PWM signal may be determined on the basis of the information about one of the temperature and the humidity detected by the one sensor.

Further, in the first and second embodiments, the electric potential difference is generated between the ink-jet head 4 and the electrode 26 by allowing the voltage supply circuit to apply the voltage to the electrode 26. All of the discharging detection output part 58, the first short circuit output part 60, and the second short circuit output part 62 are electrically connected to the electrode 26. However, there is no limitation thereto.

In a sixth modified embodiment, as depicted in FIG. 17, an inspection circuit (a circuit for inspection) 141 is connected to the ink-jet head 4. Further, the electrode 26 is retained at the ground electric potential. Further, as depicted in FIG. 18, the inspection circuit 141 is provided by removing the electrode 26 from the inspection circuit 27. The ink-jet head 4 is electrically connected to a junction **52*d*. Accordingly, in the sixth modified embodiment, the electric potential difference is generated between the ink-jet head 4 and the electrode 26 by applying the voltage to the ink-jet head 4 by means of the voltage supply circuit 51**.

In a seventh modified embodiment, as depicted in FIG. 19A, a discharging detection output part 151 is connected to the ink-jet head 4, and an amplifier circuit 152 is connected between the discharging detection output part 151 and the ink-jet head 4 in the configuration in which the voltage is applied to the electrode 26 by means of the voltage supply circuit 51 in the same manner as the first embodiment. Further, in the seventh modified embodiment, the ink-jet head 4 is connected to the ground. Note that although not depicted, the discharging detection output part and the amplifier circuit are not connected to the electrode 26 in the seventh modified embodiment.

In an eighth modified embodiment, as depicted in FIG. 19B, a discharging detection output part 161 is connected to the electrode 26, and an amplifier circuit 162 is connected between the discharging detection output part 161 and the electrode 26 in the configuration in which the voltage is applied to the ink-jet head 4 by means of the voltage supply circuit 51. Further, in the eighth modified embodiment, the electrode 26 is connected to the ground. Note that although not depicted, the discharging detection output part and the amplifier circuit are not connected to the ink-jet head 4 in the eighth modified embodiment. As described above, the voltage may be supplied to any one of the ink-jet head 4 and the electrode 26, and the discharging detection output part 151, 161 may be connected to any one of the ink-jet head 4 and the electrode 26.

Even when the electric potential difference is generated between the ink-jet head 4 and the electrode 26 by applying the voltage to any one of the ink-jet head 4 and the electrode 26, if the inks are discharged from the nozzles 10 in accordance with the inspection driving, then any voltage change occurs in the ink-jet head 4 and the electrode 26. Therefore, even in the case of the configuration of the sixth to eighth modified embodiments, it is possible to determine whether or not the inks are normally discharged from the nozzles 10 on the basis of the voltage of the discharging detection signal outputted from the discharging detection output part. Then, even in the case of the configuration of the sixth to eighth modified embodiments, it is possible to accurately determine whether or not the inks are normally discharged from the nozzles 10 by stabilizing the magnitude of the voltage applied to the ink-jet head 4 or the electrode 26 when the inspection driving is performed.

Further, in the seventh modified embodiment, a filter may be connected between the ink-jet head 4 and the ground. Further, in the eighth modified embodiment, a filter may be connected between the electrode 26 and the ground. Such a filter is provided in order that the amplitude of the signal, created by the discharging of the ink by the ink-jet head 4, is not decreased in the configuration in which the voltage is supplied to one of the ink-jet head 4 and the electrode 26 while the discharging detection output part is connected to the other. It is possible to further increase the signal outputted from the discharging detection output part by providing the filter.

Further, in the examples described above, the comparing voltage generating circuit 54 generates the comparing voltage on the basis of the PWM signal received from the controller 30. However, there is no limitation thereto. The comparing voltage generating circuit may generate the comparing voltage by means of any configuration different from the above. For example, the comparing voltage generating circuit may generate the comparing voltage by dividing the voltage supplied from the power source by means of a resistor. Further, in this case, a plurality of resistors which can be connected to the power source and a switch which switches the connection and the cutoff between the power source and the respective resistors may be provided. The comparing voltage to be generated may be changed by changing the voltage division ratio by switching the resistor to be connected to the power source by means of the switch.

Further, in the examples described above, the inspection circuit 27 has the voltage division circuit 53 which divides the voltage outputted from the voltage supply unit. Then, the comparing signal is outputted from the comparing circuit 55 on the basis of the magnitude correlation between the magnitude $|Vd|$ of the voltage Vd outputted from the voltage division circuit 53 and the magnitude $|Va|$ of the comparing voltage Va generated by the comparing voltage generating circuit 54. Then, whether or not the boosting is executed in the voltage supply circuit 51 is switched on the basis of the comparing signal. Thus, the voltage is outputted from the voltage supply circuit 51, and the voltage is applied to the electrode 26. However, there is no limitation thereto.

For example, it is also allowable to provide a comparing circuit in which the high voltage can be inputted, without providing the voltage division circuit. Then, the voltage V outputted from the voltage supply circuit 51 and the predetermined voltage Va may be inputted into the comparing circuit. The comparing signal, which corresponds to whether or not the magnitude |V| of the voltage V outputted from the voltage supply circuit 51 is larger than the magnitude |Va| of the predetermined voltage Va, may be outputted from the comparing circuit.

Further, in the examples described above, the inspection circuit has the first short circuit output part 60 which outputs the signal corresponding to whether or not the continuous short circuit is formed between the ink-jet head 4 and the electrode 26 and the second short circuit output part 62 which outputs the signal corresponding to whether or not the temporary short circuit is formed between the ink-jet head 4 and the electrode 26. However, there is no limitation thereto. It is also allowable that the inspection circuit has only one of the first short circuit output part 60 and the second short circuit output part 62. Alternatively, it is also allowable that the inspection circuit does not have both of the first short circuit output part 60 and the second short circuit output part 62.

Further, in the exemplary cases described above, the inspection circuit has the electric discharge circuit 63. However, the electric discharge circuit may have any configuration different from that explained above. Alternatively, it is also allowable that the inspection circuit does not have the electric discharge circuit.

Further, in the embodiment described above, the inspection driving is performed for all of the nozzles 10 of the ink-jet head 4 to determine whether or not the inks are normally discharged from the nozzles 10. However, there is no limitation thereto. For example, the inspection driving may be performed for only some of the nozzles 10 of the ink-jet head 4, for example, for only alternate nozzles 10 on each of the nozzle arrays 9 to determine whether or not the inks are discharged normally from the nozzles 10. Then, as for the other nozzles 10, it is also allowable to estimate whether or not the inks are discharged normally from the nozzles 10 on the basis of the determination result about the some of the nozzles 10 described above.

Further, in the examples described above, the discharging detection signal, which is outputted from the discharging detection output part, is the signal which depends on whether or not the ink is discharged from the nozzle 10. Then, if the discharging detection signal indicates that the ink is discharged from the nozzle 10, it is determined that the ink is normally discharged from the nozzle 10. However, there is no limitation thereto. The discharging detection signal may be any signal which corresponds to any other discharging mode distinct from whether or not the ink is discharged, including, for example, the discharging direction and the discharging speed of the ink. Then, it is also allowable to determine that the ink is normally discharged from the nozzle 10, when the discharging detection signal indicates that the ink is discharged from the nozzle 10 in accordance with the predetermined discharging mode.

Further, in the foregoing description, the example has been explained, in which the present disclosure is applied to the printer provided with the so-called serial head for discharging the inks from the plurality of nozzles while moving in the scanning direction together with the carriage. However, there is no limitation thereto. For example, the present disclosure can be also applied to a printer provided with a so-called line head extending over the entire length of the recording paper in the scanning direction.

Further, in the foregoing description, the example has been explained, in which the present disclosure is applied to the printer for performing the recording on the recording paper P by discharging the inks from the nozzles. However, there is no limitation thereto. The present disclosure is also applicable to any printer for recording an image on a recording medium other than the recording paper, including, for example, T-shirt, sheets for outdoor advertisement, cases for mobile phone terminals such as smartphones or the like, corrugated cardboards, and resin members. Further, the present disclosure is also applicable to any liquid discharging apparatus for discharging any liquid other than the ink, including, for example, resins and metals in liquid states.

What is claimed is:

1. A liquid discharging apparatus comprising:

a liquid discharging head having a nozzle configured to discharge a liquid;

an electrode configured to oppose the nozzle in a manner that the liquid discharged from the nozzle flies toward the electrode; and an inspection circuit comprising:

an adjustable voltage source configured to generate an electric potential difference between the liquid discharging head and the electrode by applying a voltage to the liquid discharging head or the electrode;

a discharge detection circuit electrically connected to the liquid discharging head or the electrode, the discharge detection circuit being configured to output a voltage corresponding to an electric change caused in a case that the liquid discharging head performs an inspection driving for discharging the liquid from the nozzle toward the electrode while the liquid discharging head and the electrode are opposed to one another; and a voltage comparison circuit electrically connected to the adjustable voltage source, wherein:

the voltage comparison circuit is configured to output a comparing signal indicating whether or not a magnitude of the voltage outputted from the adjustable voltage source is larger than a magnitude of a predetermined voltage;

the adjustable voltage source is configured to:

execute boosting to increase the magnitude of the voltage to be outputted from the adjustable voltage source in a case that the comparing signal indicates that the magnitude of the voltage outputted from the adjustable voltage source is not more than the magnitude of the predetermined voltage; and stop the boosting in a case that the comparing signal indicates that the magnitude of the voltage outputted from the adjustable voltage source is larger than the magnitude of the predetermined voltage.

2. The liquid discharging apparatus according to claim 1, wherein the comparing signal is input into the adjustable voltage source.

3. The liquid discharging apparatus according to claim 2, further comprising a controller configured to output a permission signal indicating whether or not execution of the boosting by the adjustable voltage source is permitted; wherein the adjustable voltage source is configured to receive the permission signal; and the adjustable voltage source is configured to:

execute the boosting in a case that the comparing signal indicates that the magnitude of the voltage outputted from the adjustable voltage source is not more than the magnitude of the predetermined voltage, and the permission signal indicates that the execution of the boosting is permitted; and stop the boosting in a case that the comparing signal indicates that the magnitude of the voltage outputted from the adjustable voltage source is larger than the magnitude of the predetermined voltage, or the permission signal indicates that the execution of the boosting is not permitted.

4. The liquid discharging apparatus according to claim 2, further comprising a controller configured to output:

a permission signal indicating whether or not execution of the boosting by the adjustable voltage source is permitted; and an ON/OFF signal indicating whether the adjustable voltage source is to be an ON state or an OFF state, the adjustable voltage source being capable of executing the boosting in the ON state and being incapable of executing the boosting in the OFF state, wherein the adjustable voltage source is configured to:

receive the permission signal;

receive the ON/OFF signal;

execute the boosting in a case that the comparing signal indicates that the magnitude of the voltage outputted from the adjustable voltage source is not more than the magnitude of the predetermined voltage, the permission signal indicates that the execution of the boosting is permitted, and the ON/OFF signal indicates that the adjustable voltage source is to be in the ON state; and stop the boosting in a case that the comparing signal indicates that the magnitude of the voltage outputted from the adjustable voltage source is larger than the magnitude of the predetermined voltage, the permission signal indicates that the execution of the boosting is not permitted, or the ON/OFF signal indicates that the adjustable voltage source is to be in the OFF state.

5. The liquid discharging apparatus according to claim 1, further comprising a controller configured to:

receive the comparing signal;

output a control signal for controlling the adjustable voltage source, the control signal instructing the adjustable voltage source to execute the boosting for raising the magnitude of the voltage outputted from the adjustable voltage source, or instructing the adjustable voltage source to stop the boosting;

output the control signal instructing the adjustable voltage source to execute the boosting, in a case that the comparing signal indicates that the magnitude of the voltage outputted from the adjustable voltage source is not more than the magnitude of the predetermined voltage; and output the control signal instructing the adjustable voltage source to stop the boosting, in a case that the comparing signal indicates that the magnitude of the voltage outputted from the adjustable voltage source is larger than the magnitude of the predetermined voltage;

the adjustable voltage source being configured to receive the control signal; and the adjustable voltage source is configured to:

execute the boosting in a case that the control signal instructs the adjustable voltage source to execute the boosting; and stop the boosting in a case that the control signal instructs the adjustable voltage source to stop the boosting.

6. The liquid discharging apparatus according to claim 5, wherein:

the controller is configured to output a permission signal indicating whether or not execution of the boosting by the adjustable voltage source is permitted;

the adjustable voltage source is configured to receive the permission signal; and the adjustable voltage source is configured to:

execute the boosting in a case that the control signal instructs the adjustable voltage source to execute the boosting, and the permission signal indicates that the execution of the boosting is permitted; and stop the boosting in a case that the control signal instructs the adjustable voltage source to stop the boosting, or the permission signal indicates that the execution of the boosting is not permitted.

7. The liquid discharging apparatus according to claim 5, wherein the controller is configured to output:

a permission signal indicating whether or not execution of the boosting by the adjustable voltage source is permitted; and an ON/OFF signal indicating whether the adjustable voltage source is to be an ON state or an OFF state, the adjustable voltage source being capable of executing the boosting in the ON state and being incapable of executing the boosting in the OFF state, the adjustable voltage source is configured to:

receive the permission signal;

receive the ON/OFF signal;

execute the boosting in a case that the control signal instructs the adjustable voltage source to execute the boosting, the permission signal indicates that the execution of the boosting is permitted, and the ON/OFF signal indicates that the adjustable voltage source is to be in the ON state; and stop the boosting in a case that the control signal instructs the adjustable voltage source to stop the boosting, the permission signal indicates that the execution of the boosting is not permitted, or the ON/OFF signal indicates that the adjustable voltage source is to be in the OFF state.

8. The liquid discharging apparatus according to claim 1, wherein the inspection circuit further comprises a main circuit connecting the adjustable voltage source and the liquid discharging head or the electrode such that the adjustable voltage source applies the voltage to the liquid discharge head or the electrode, wherein the voltage comparison circuit includes:

a voltage division circuit connected at a junction to the main circuit and configured to divide the voltage outputted from the adjustable voltage source;

a comparing voltage generating circuit configured to generate a comparing voltage corresponding to the predetermined voltage, the comparing voltage being a voltage to be compared with a voltage outputted from the voltage division circuit; and a comparing circuit configured to output, as the comparing signal, a signal indicating whether or not a magnitude of the voltage outputted from the voltage division circuit is larger than a magnitude of the comparing voltage.

9. The liquid discharging apparatus according to claim 8, further comprising a controller configured to output a PWM signal for generating the comparing voltage, wherein the comparing voltage generating circuit is configured to receive the PWM signal; and the comparing voltage generating circuit is configured to generate the comparing voltage based on the PWM signal.

10. The liquid discharging apparatus according to claim 9, wherein:

the controller is configured so that the PWM signal is capable of being changed; and the controller is configured to output the PWM signal corresponding to the magnitude of the voltage outputted from the discharge detection circuit.

11. The liquid discharging apparatus according to claim 10, further comprising:

a sensor configured to obtain environmental information being information about a temperature and/or information about a humidity; and a storage storing association information in which the environmental information and the comparing voltage are associated with one another, wherein:

the controller is configured so that the PWM signal is capable of being changed; and the controller is configured to output the PWM signal corresponding to the environmental information obtained by the sensor and the association information stored in the storage.

12. The liquid discharging apparatus according to claim 9, further comprising at least one short circuit detection circuit connected to the main circuit, the at least one short circuit detection circuit being configured to output a voltage corresponding to a magnitude of a leak current flowing between the liquid discharging head and the electrode, wherein:

the controller is configured so that the PWM signal is capable of being changed; and the controller is configured to output the PWM signal corresponding to a magnitude of the voltage outputted from the at least one short circuit detection circuit.

13. The liquid discharging apparatus according to claim 1, further comprising a cap, wherein the electrode is within the cap.

* * * * *